United States Patent
Breiter et al.

(10) Patent No.: US 8,055,773 B2
(45) Date of Patent: Nov. 8, 2011

(54) METHOD AND SYSTEM FOR EXECUTING SYSTEM MANAGEMENT FLOWS

(75) Inventors: Gerd Breiter, Wildberg (DE); Einar Lueck, Schoenbuch (DE); Ruediger Maass, Boeblingen (DE); Steffen Rost, Nufringen (DE); Thomas Spatzier, Schuenaich (DE)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/556,728

(22) Filed: Nov. 6, 2006

(65) Prior Publication Data
US 2008/0109806 A1    May 8, 2008

(51) Int. Cl.
*G06F 15/173* (2006.01)
(52) U.S. Cl. .................................. 709/226; 709/229
(58) Field of Classification Search .......... 709/223–229, 709/203; 718/101
See application file for complete search history.

(56) References Cited

U.S. PATENT DOCUMENTS

| | | | |
|---|---|---|---|
| 5,568,605 A | 10/1996 | Clouston et al. | |
| 6,058,426 A * | 5/2000 | Godwin et al. | 709/229 |
| 6,112,243 A * | 8/2000 | Downs et al. | 709/226 |
| 6,901,440 B1 | 5/2005 | Bimm et al. | 709/223 |
| 7,167,821 B2 | 1/2007 | Hardwick et al. | |
| 7,644,410 B1 * | 1/2010 | Graupner et al. | 718/104 |
| 7,685,283 B2 * | 3/2010 | Boyce et al. | 709/226 |
| 7,778,888 B2 * | 8/2010 | Daur et al. | 705/27 |
| 2002/0194251 A1 * | 12/2002 | Richter et al. | 709/105 |
| 2004/0064558 A1 * | 4/2004 | Miyake | 709/226 |
| 2004/0122983 A1 | 6/2004 | Speed et al. | |
| 2005/0131773 A1 | 6/2005 | Daur et al. | |
| 2005/0154735 A1 * | 7/2005 | Breh et al. | 707/10 |
| 2008/0052718 A1 * | 2/2008 | Hundscheidt | 718/104 |
| 2008/0319857 A1 * | 12/2008 | Dobbins et al. | 705/14 |

OTHER PUBLICATIONS

U.S. Appl. No. 11/428,725 Final Office Action—Feb. 10, 2011.
U.S. Appl. No. 11/428,725 Non Final Office Action Mailed Oct. 1, 2010.

* cited by examiner

*Primary Examiner* — Faruk Hamza
(74) *Attorney, Agent, or Firm* — Cantor Colburn LLP; Steven Chiu

(57) ABSTRACT

Orders are processed within an Order Processing Environment which includes an Order Processing Container, Relationship Registry, and Factory Registry. The Order Processing Environment is extended by a Reference Resolvement Function Component. The RRFC provides the basic functionality for resolving References defined in the Order Document at runtime and make the referenced data available as a usual input parameter for the resources involved in the Order Processing. Each Task in the Order may contain Resource Property References and Resource Property Relationship References which are pointers to properties of resources. These references are resolved by the RRFC during the Order Processing before the Order Document is delegated from one resource to the next. When resolving a Reference, the value of the referenced Resource Property is determined and the Reference is replaced by this value so that it can be used by the resource having it defined in its Task section as a usual input parameter. Hence, by using References, resources are able to get access to the properties of other resources that participate in the Order Processing or are contained in the Resource Topology tree and use them as an input parameter for executing their own Task without having to know where the data is gathered from.

17 Claims, 20 Drawing Sheets

METHOD AND SYSTEM FOR EXECUTING SYSTEM MANAGEMENT FLOWS

CROSS REFERENCES TO RELATED APPLICATIONS

U.S. patent application Ser. No. 11/428,725, filed Jul. 5, 2006, entitled "Method and System for Dynamically Creating and Modifying Resource Topologies and Executing Systems Management Flows", is assigned to the same assignee hereof, International Business Machines Corporation of Armonk, N.Y., and contains subject matter related, in certain respect, to the subject matter of the present application. The above-identified patent application is incorporated herein by reference in its entirety.

TECHNICAL FIELD OF THE INVENTION

The present invention relates in general to the field of systems management of IT Service Environment and in more particular to a method and system for executing system management flows in system management systems for such IT Service Environments.

BACKGROUND ART

Today's IT infrastructures are composed of a large number of heterogeneous, distributed stateful IT resources (see also layer "IT Resources" in FIG. 1). That is, IT services typically comprise or are hosted by several heterogeneous IT resources (e.g. servers, operating systems on those servers, databases, application server software, etc.). The term IT Service Environment is used for a collection of resources and a set of behavioural conditions that all together define a specific IT service. IT services may be part of outsourcing agreements of IT services providers with customers, or they may be in-house applications.

For each of the resources used by IT Services several resource-specific management functions are available for controlling the operation of a resource, i.e. for creating (provisioning), destroying (de-provisioning) and controlling the operation and configuration of a stateful resource. Resource management functions of a resource may also control other resources—for example, a resource that acts as a resource manager may offer a service to create/provision a new instance of a certain other resource. The described view on the management capabilities of resources is depicted as "Systems Management Layer" in FIG. 1. This layer summarizes the management interfaces of the resources.

In order to perform systems management in the scope of a whole IT Service Environment (in contrast to single resources) an integration of single Systems Management Tasks into a systems-wide Systems Management Flow is necessary in order to treat the IT Service Environment as a whole and to keep it in a consistent state (see also layer "Systems Management Flows" in FIG. 1). Thus Systems Management Flows play a key role for the management of IT Services.

Another important aspect is to provide the data the distributed resources of the IT Service Environment acts upon at runtime in an appropriate way. So for example, a resource may require information of another resource to perform its system management task.

As an example for a Systems Management Flow, it is assumed that a new server WebServer3 has to be provisioned as depicted in FIG. 2. The related simplified Systems Management Flow could contain following Tasks (the following list first mentions the resources that perform the Tasks followed by a brief description of the Tasks):

Systems Management Flow 1:

Cluster1: task create server resource: create a new logical server and name it WebServer3; add a relationship from Cluster1 to WebServer3

WebServer3: task initial application start (including install and start image): obtain a new physical server from the server free pool; load and install a system image that contains an operating system and a web server application on WebServer3 from an image management system; reboot WebServer3

LoadBalancer: task register web server: add host name and IP-address of WebServer3 to the list of available web servers for load balancing The data required by the resources performing the system management tasks have to be provided in an appropriate way. In the example discussed before, the WebServer3 resource needs information about the cluster and the resource pool it can use to obtain a new physical server. This information is provided by the Cluster1 resource. The LoadBalancer resource needs information about the host name and the IP address to be able to register the newly created web server. This information is provided by the WebServer3 resource. FIG. 2 shows the required data mappings in the discussed system management flow.

Initial Problem

Systems Management Flows can change when the underlying IT system changes. The more features, combinations of features, and different implementations of features a management solution offers, the more different Systems Management Flows must be defined and handled. There is a potentially large number of different Systems Management Flows required due to the quickly growing number of possible different IT Service Environment definitions. This can be compared to the assembly process in the automotive industry: the more options and accessories are offered for a car (e.g., engine type, transmission, colour, wheels, spoilers, etc.) the more complicated the assembly process gets and the more different car configurations can be produced.

Changes of the IT system landscape could require adapting a large part or even all of the Systems Management Flows. Because of the potentially large number and the complexity of Systems Management Flows, administration and maintenance of Systems Management Flow definitions is a demanding challenge.

Considering the sample system management flow depicted in FIG. 1 again, let us assume that the web server application should be installed by an individual task and that the image management system provides images containing the operating system only (these images could then also be used as a basis for the installation of other applications in different environments). For this purpose, an additional layer of operating system resources OS Server[n] is added to the resource topology and the task for the initial application start is decomposed into two tasks (see also FIG. 4). The adapted systems management flow would look like this:

Systems Management Flow 2:

Cluster1: task create server resource: create a new logical server and name it Server3; add a relationship from Cluster1 to OSServer3

OSServer3: task initial operating system start (including install and start OS image): obtain a new physical server from the server free pool; load and install a system image that contains an operating system only on OSServer3 from an image management system; reboot OSServer3; create a new logical server and name it WebServer3; add a relationship from OSServer3 to WebServer3

WebServer3: task initial application start (including install and start of the web server application): load and install a package that contains the web server application on WebServer3

LoadBalancer: task register web server: add host name and IP-address of WebServer3 to the list of available web servers for load balancing If the targeted management solution has to support both of the discussed features (provide complete images as well as OS images and web server installation packages) it would be necessary to provide the two discussed systems management flows for provisioning new web servers.

The second system management flow would not only have to consider one additional operating system resources layer, but also the data distribution and data access would change. So in system management flow 1 the WebServer3 resource did only depend on the Cluster1 resource to get required information, such as cluster and resource pool information. The other information, such as IP address and credentials, resulted from the system management task to install and start a system image, which was performed by the cluster task itself. In contrast, in the second system management flow the installation of the operating system and the web server application are separated and hence performed by different resources. The OS installation is performed by the new OSServer3 resource and requires information about the cluster and the resource pool, which has to be provided by the Cluster1 resource. The Web Server installation is performed by the resource WebServer3, and the required information such as the IP address, operating system type and the operating system credentials has now been provided by the OSServer3 resource. FIG. 5 shows the changed data mappings in the system management flow 2.

Decomposing the Task to install a web server application also changes the relationships and the necessary knowledge of the participating resources among each other. In system management flow 2, the OSServer3 resource has to be aware that the WebServer3 resource depends on its input, and therefore has to make sure to provide the required data.

Hence supporting new features or changing existing ones results in changes of the data exchange among the involved system management tasks. Adapting the data exchange each time supported features change is error-prone, time consuming, and requires recompilation of the workflows in traditional workflow engines. A better approach would be to define data exchange only in a descriptive manner and let the system management system provide the data at runtime.

Prior Art

At the lowest level, System Management Flows are described by a set of machine-unreadable documents containing lists of System Management Tasks to be performed in a more or less specific way for the operator. This way of implementing Systems Management Flows is error-prone, time consuming, and requires administrators with a broad knowledge for interpreting the documents correctly and to run management tools and other programs with appropriate configuration parameters in the correct sequence.

At the next level, scripts and programs are used to support development and execution of System Management flows. While being very efficient this solution has the drawback that it does not use any standardized way for choreographing multiple tasks.

At a higher level, workflow techniques are used to define and run Systems Management Flows. Workflow techniques integrate several services into an overall flow in a clearly defined and consistent way. An established standard for describing workflows that integrates services having Web Services interfaces is the Business Process Execution Language (BPEL). BPEL descriptions of flows involving several single services can be executed by workflow processing engines (e.g. WebSphere Process Server). There also workflow engines / workflow systems supporting adaptive workflows. Adaptive workflows can be modified by modification operations during their instance life cycle in contrast to static workflow instances as provided by most of the workflow engines (especially, BPEL-engines).

Workflow engines/workflow systems provide data mapping techniques to obtain the required data in activities from preceding activities or the process input. Data mapping requires less development effort and is more flexible when changes in the process model are necessary. The data mapping logic (code) is typically isolated from the implementation of the activities to minimize its dependencies from changes in the mapping logic.

The IBM Tivoli Provisioning Manager (TPM) and the IBM Tivoli Intelligent Orchestrator (TIO) products both automated manual tasks of provisioning and configuring servers and virtual servers, operating systems, middleware, applications, storage and network devices acting as routers, switches, firewalls, and load balancers. Both products contain a deployment engine (DE) which acts as a proprietary workflow engine on entities (resources) which are part of a data center model. One of the features of the DE is the support of the hierarchical workflow/sub-workflow pattern in a very powerful and integrated way.

EP 1636743A1 describes another approach for integrating resource management functions into Systems Management Flows by a so-called resource catalog. The basic idea is that the resource catalog contains resources either being expandable node elements or being leaf elements of a resource tree. The node elements represent composed logical resources (for example, a load balanced web application) which are more and more refined towards the leaf elements which refer to concrete resources, like servers, firewalls, etc. The resource tree is built up in such a manner, that Systems Management Flows are derived from the sequence of the leaf nodes from left to right. The sequence of the leaf nodes and corresponding resource management actions from a resource management actions catalog are compiled to a service environment definition which basically defines a set of flows that can be executed on any workflow engine. The techniques that have been described here are also depicted in FIG. 6.

Residual Problems

The technologies mentioned above already allow for the integration of several systems management tasks into an overall Systems Management Flow. However, these technologies have some disadvantages.

All mentioned workflow based technologies provide some kind of definition language for specifying workflows. Systems Management Flows can be represented in such systems by corresponding workflow definitions. These definitions describe in which sequence activities are to be executed. So these descriptions are very sensitive to changes in the IT Infrastructure. As stated earlier, there is a potentially large number of different system management flows required. Changes of the IT system landscape could require adapting all or part of the Systems Management Flows. This means that the corresponding workflow definitions must be changed accordingly which results in a complex administration of workflow definitions.

The usage of workflow data mapping techniques does not avoid those activities which provide data for subsequent activities have to write this data by itself to the workflow output container. Thus, changes in the process model, such as integrating new activities which require data from preceding activities, result in additional development effort for these already existing activities (an activity could only avoid this dependency by always writing all its data to its output). A further problem is that changes of the data maps require a recompilation of the workflow. Therefore it would be much better to have the possibility to define the data exchange between the workflow activities in a descriptive way without the need to recompile the workflow and let the workflow engine take the required steps to supply the data at runtime.

Instead of storing Systems Management Flows directly as workflow definitions, it is desirable to derive Systems Management Flows from a more stable basis that is easier to handle when changes in the IT infrastructure or changes in the offerings of the management solution for the customer occur.

EP 1636743A1 proposes such a strategy, as described above. Changes of the IT infrastructure or changes in the offerings of the management solution for the customer can be handled by simply adding new resources to or modifying resources in the resource catalog and add or modify resource management action definitions. The drawback of the solution is that the changes do not become effective in existing, instantiated service environments. Only new subscriptions can benefit from the changes since the instantiation of the service environment for a subscription is the result of a compilation process that is performed only once at the beginning of a service environment life cycle. The mentioned compilation process includes the creation of the resource tree starting from a root node element, and the derivation of the resulting workflow and the parameter mappings from the resource tree.

OBJECTS OF THE INVENTION

It is object of the present invention to provide a method and system for executing system management flows in system management systems for IT Service Environment by avoiding disadvantages of the prior art as discussed above.

SUMMARY OF THE INVENTION

The present invention provides system management system called "Order Processing Environment". The Order Processing Environment consists of an Order Processing Container ("Container"), a Reference Resolvement Function Component ("RRFC"), a Relationship Registry, and a Factory Registry. The Factory Registry supports creation of new resource instances. The Relationship Registry stores relationships between resources. The Container gets as input an Order and a start point address for the first resource. The Order is a document (e.g., XML) which includes a number of Tasks for each involved resource without arranging those tasks in a sequence. This differentiates Orders from workflow descriptions used by standard workflow engines. Each Task includes at least all input parameters for executing the Task. The sequence of the Task execution is derived by the Container by using the Relationship Registry which reflects all current Resource Topologies. In addition to the input parameters each Task contains a Topology section which describes a new set of relationships and resources that are to be created or deleted. Also, each Task contains Resource Property References and Resource Property Relationship References which are pointers to properties of resources. These references are resolved by the RRFC during the Order Processing before the Order Document is delegated from one resource to the next. When resolving a Reference, the value of the referenced Resource Property (Resource Property are defined in the WS-ResourceProperties standard, see Glossary) is determined and the Reference is replaced by this value so that it can be used by the resource having it defined in its Task section as usual input parameter. Hence, by using References, resources are able to get access to the properties of other resources that participate in the Order Processing or are contained in the Resource Topology and use them as input parameter for executing their own Task.

After having received the Order the Container hands over the Order to the first resource which has been instantiated by a previous Order or by a separate system, e.g. Subscription Registry that creates a subscription resource that reflects a contract with a customer. The first resource reads its related input parameters from the Order and executes the Task by using the System Management components of the System Management Layer, writes output results to the Order as required, and returns the Order to the Container. The Container retrieves the next resource for Order Processing by querying the Relationship Registry. Before delegating the Order to the next resource, the Container calls the RRFC. The RRFC resolves on one hand all Resource Property References that reference properties of the resource that just has finished its Order Processing, and on the other hand all Resource Property Relationship References that relate to the resource that is to be called next. Then the RRFC gives the control back to the Container, who hands the Order over to the next resource which in turn executes its related Task, updates the Order and finally hands over the Order to Container again. This procedure is repeated until all resources have processed the Order.

In addition to the definition of the input parameters in the Task description for a resource an Order topology section may be included to define a set of relationships and resources to be created or removed. The Container instantiates new resources by using the Factory Registry and adds the new relations to the Relationship Registry.

Separating the flow definition information from the Order, providing the Relationship Registry which reflects the Resource Topology, using References to define the data exchange between the resources in a descriptive way and let the RRFC provide the data at runtime, and deriving System Management flows from the Resource Topology forms a stable basis for modifications of the underlying IT infrastructure without taking notice of the sequence of the Tasks in respective Orders.

In one embodiment, a computer program product stored on computer usable medium comprising computer readable program instructions for causing a computer to perform the following method steps when the computer program is executed on a computer. The computer comprises a system management system. The system management system is an Order Processing Environment. The Order Processing Environment includes at least an Order Processing Container, Relationship Registry, and an Order which is being processed by said Order Processing Container. The Order includes a number of resource specific Tasks without arranging those in a sequence. The Tasks provide actions for creating and/or modifying resource topologies. Each Task includes Resource Property References specified by Resource Type and Resource Property Name and Resource Property Relationship References specified by Resource Type and at least one Relation name and Resource Property Name. The method is part of the normal Order Processing and is being executed if the Order is returned from a resource (sending resource) to the Container. The method steps comprising:

a) querying the Order for all Resource Property References which specify properties of the sending resource,
b) determining the values of the specified properties of sending resource,
c) replacing the references by the values in the Order,
d) querying the Relationship Registry for a resource which has a relationship to the sending resource by the Order Processing Container,
e) querying the Order for the resource of step d) for resource property relationship references which specify properties of the identified resource as a starting point,
f) querying the Relationship Registry for a resource which has a relationship to the resource of step d) and which is named by a relation name specified in the resource property relationship reference,
g) determining the values of the specified properties of the resource according to step f),
h) replacing the resource property relationship reference by the values in the Order, and
j) repeating the steps a)-h) for all sending resources.

DETAILED DESCRIPTION OF THE INVENTION

In the context of this invention an asynchronous operation is defined as an operation that immediately returns to the caller of the operation without a result. The called operation is executed later at same point in time. In this sense, implementation examples for asynchronous operations are one-way web service operations, or operations that are called via messages which are delivered by a messaging system like JMS (Java Messaging System).

Resources in the Context of Order Processing

Resources that take part in Order Processing implement the asynchronous operation processOrder. The only parameter of this operation is the Order that is handed over to the resource by the Container. When being called by processOrder the resource interprets the input parameters of its associated Task section in the Order and executes the Task. A Task can perform any operation. Typically, the resource calls components of the Systems Management Layer in order to fulfil the Task. There is no specification for the interfaces of the components in the Systems Management Layer. The resource has to cover the interfacing by itself, the Order Processing Environment does not provide any support for this issue. While executing the Task, the resource may write results to its Task section in the Order. Finally, the resource calls the Container of the Order Processing Environment by its asynchronous operation delegateOrder and hands over the (updated) Order back again.

Figure 1:
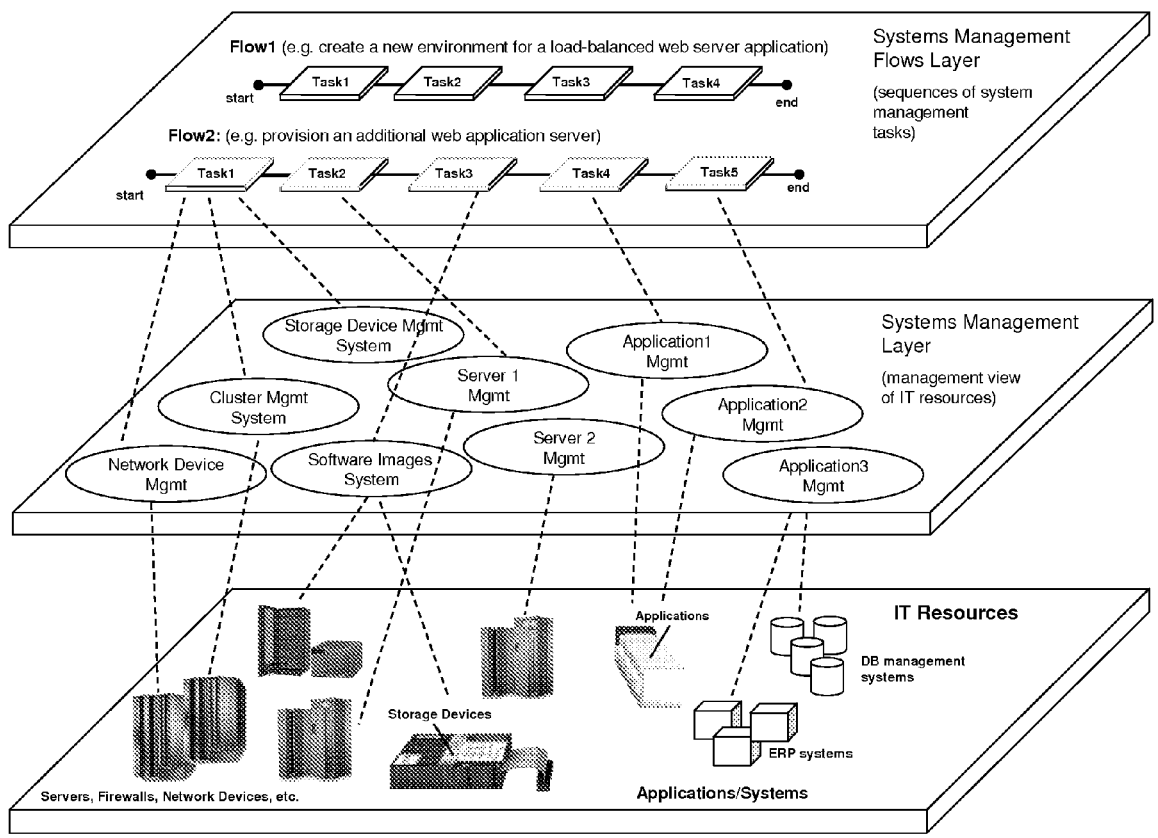
FIG. 1 shows a prior art integration of Resource Management Functions into Systems Management Flows.
Figure 2:
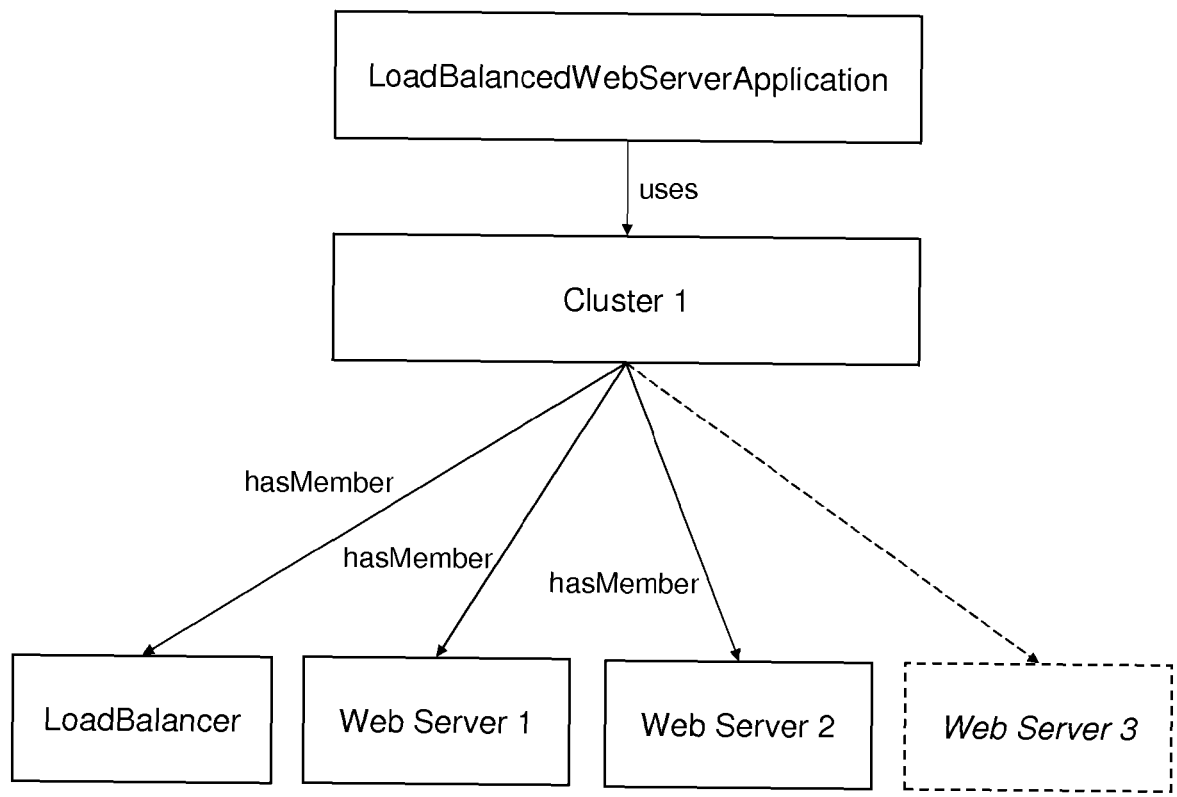
FIG. 2 shows an example of a System Management Flow (System Management Flow 1: Provisioning of a new server based on complete system images) according to the prior art.
Figure 3:
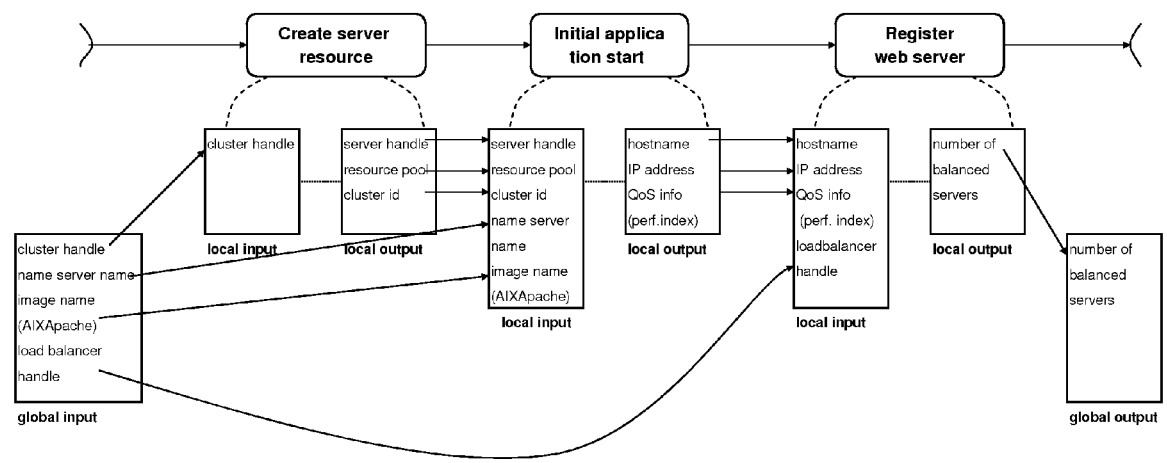
FIG. 3 shows the data mapping of the System Management Flow depicted in FIG. 2.
Figure 4:
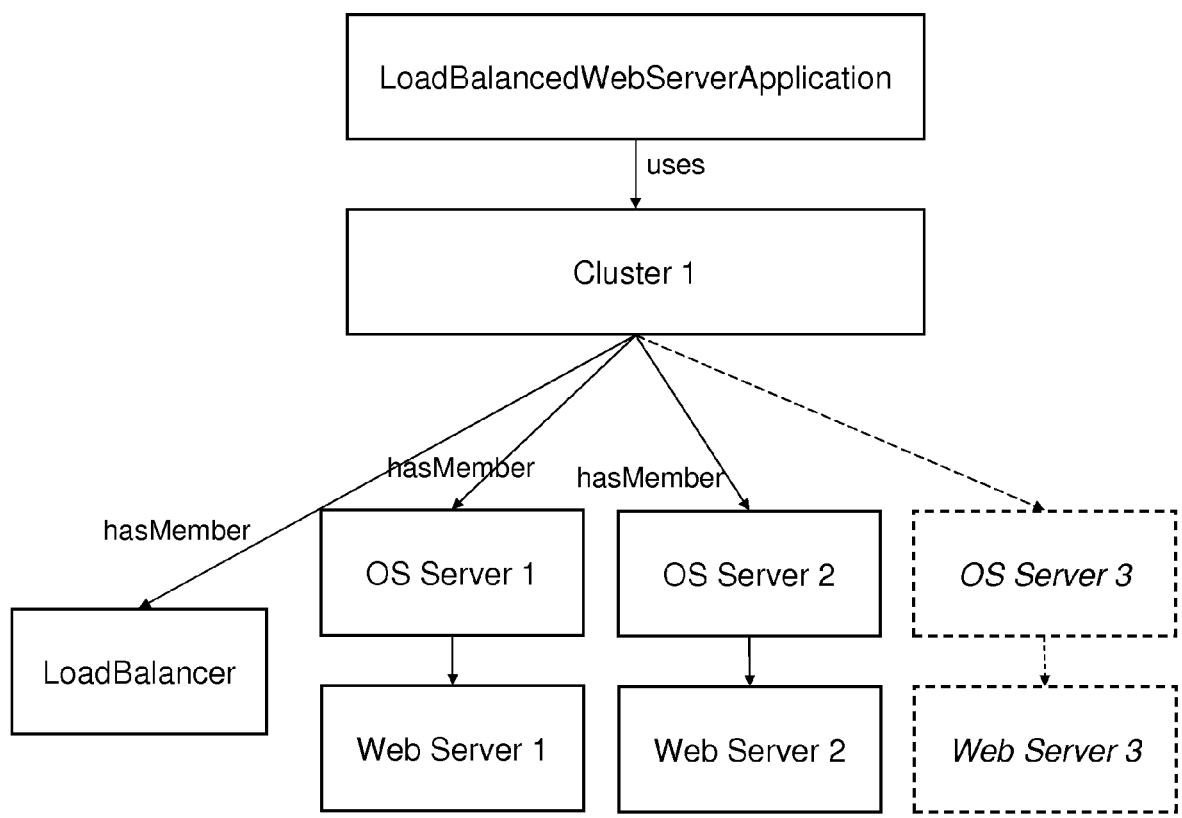
FIG. 4 shows an example of a System Management Flow (System Management Flow 2: Provisioning of a new server based on OS system images) according to the prior art.
Figure 5:
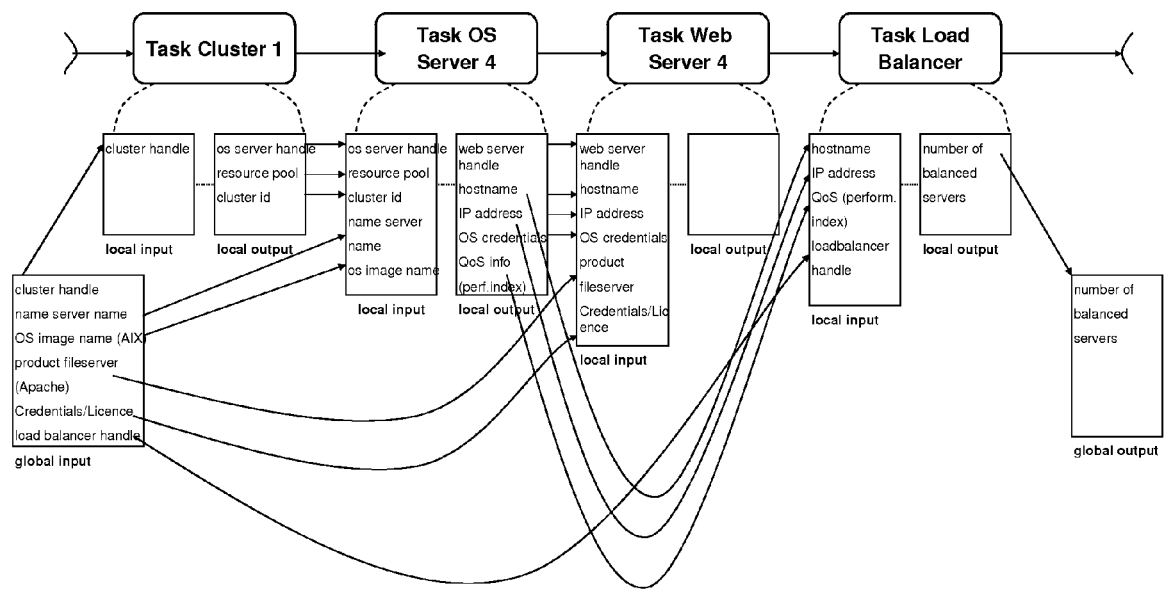
FIG. 5 shows the data mapping of the System Management Flow depicted in FIG. 4.
Figure 6:
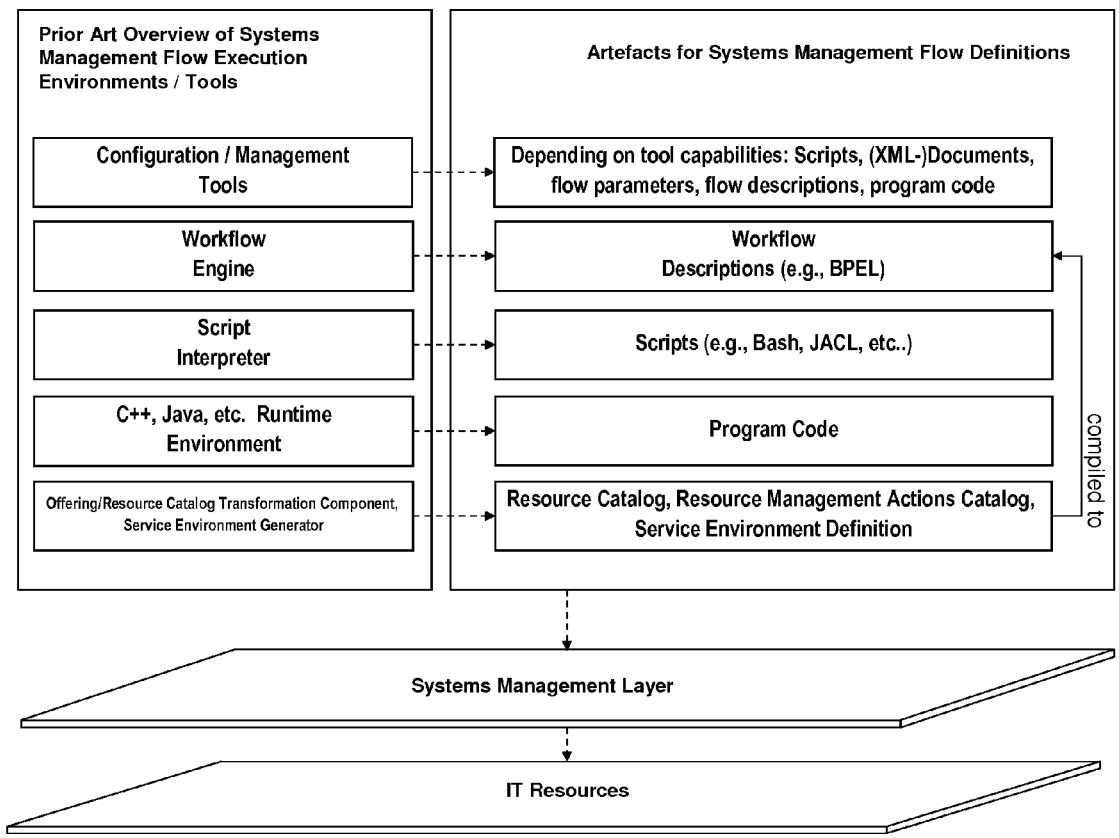
FIG. 6 shows a prior art System Management Flow execution environment.
Figure 7:
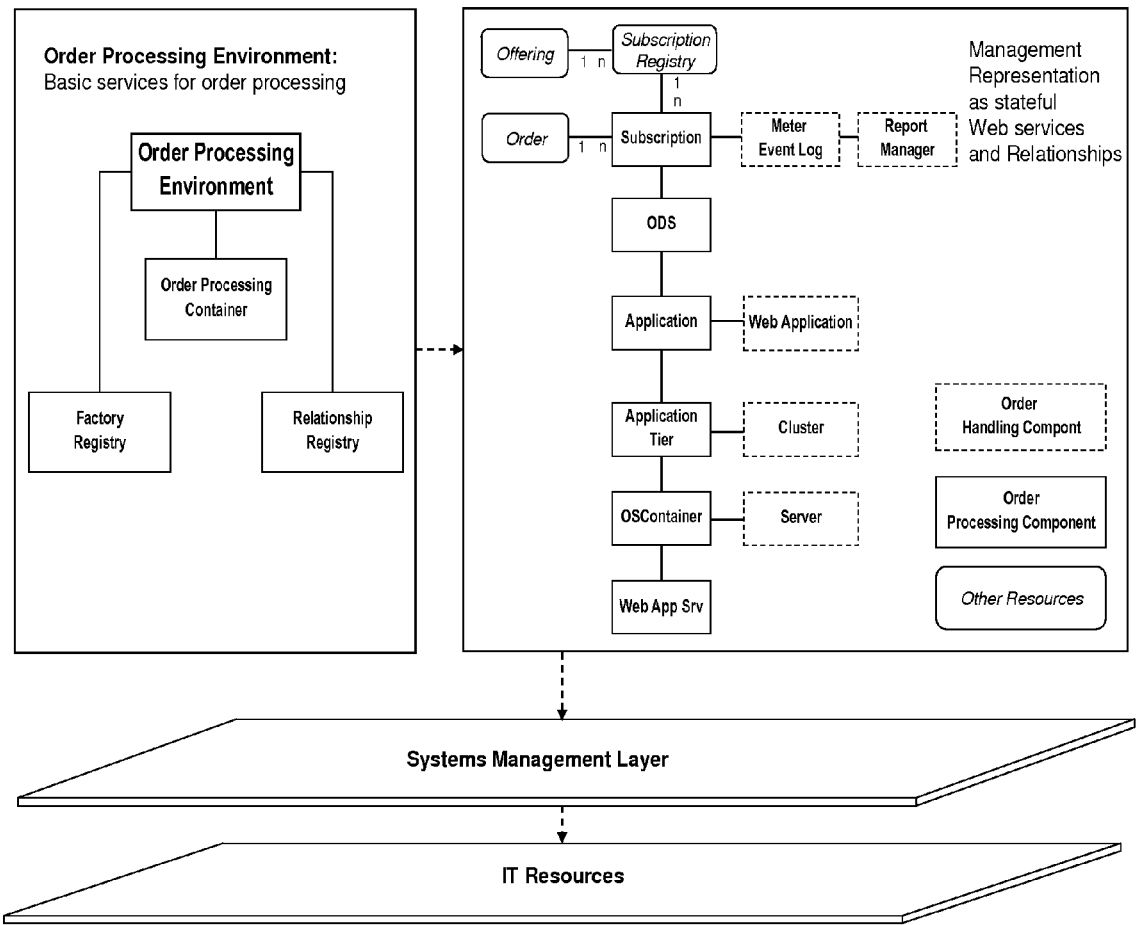
FIG. 7 shows the Order Processing Environment.
Figure 8:
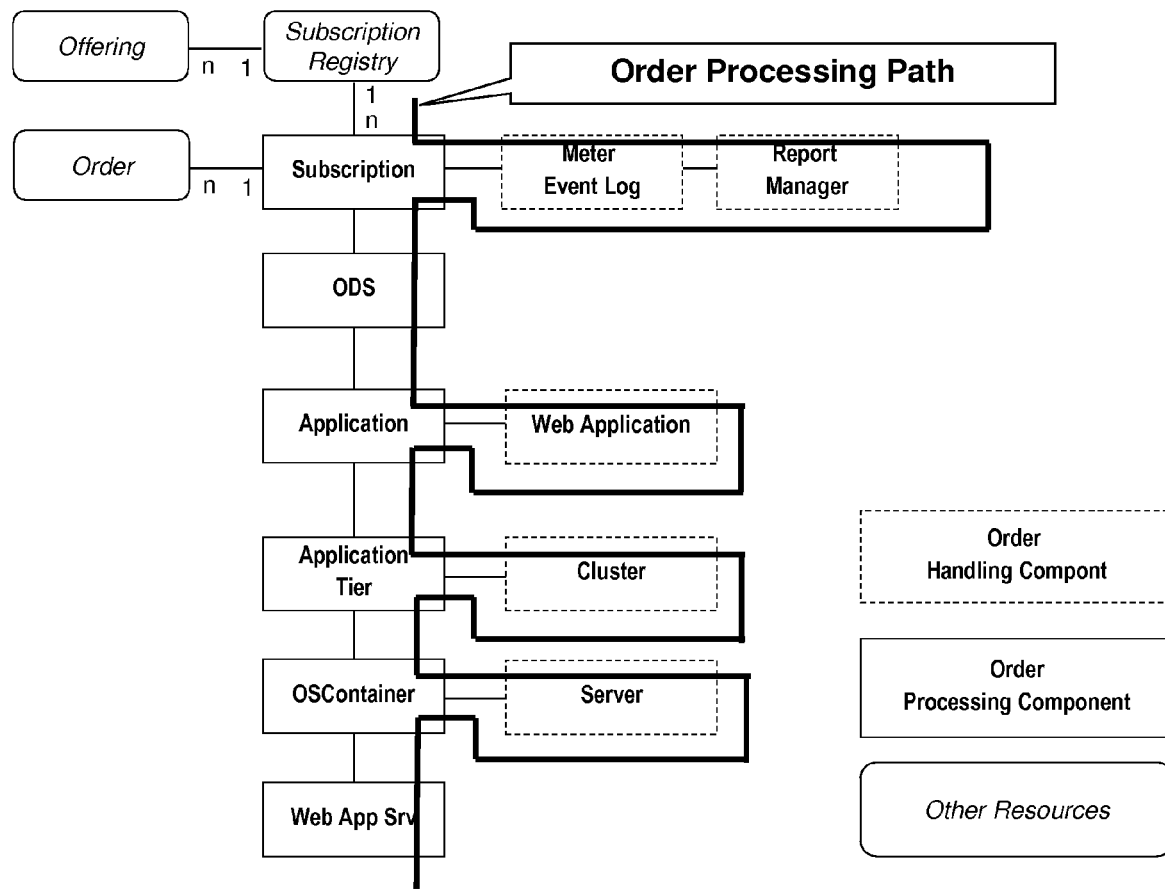
FIG. 8 shows the Order Processing Path.

There are two roles defined for resources in the context of Order Processing: role Order Processing Component and role Order Handling Component. Order Processing Components represent the base nodes of the Resource Topology. Each resource with role Order Processing Component has a related chain of resources with role Order Handling Component. Instead of using the terms "resources with role Order Handling Component" and "resources with role Order Processing Component" we simplify our wording and use "Order Handling Components" and "Order Processing Components", respectively, in the following text. The Order Handling Component chain may also be empty for an Order Processing Component. For example, resource Subscription in FIG. 7 has an associated chain of two Order Handling Components (MeterEventLog and ReportManager), resource ODS has no associated Order Handling Components (in other words, the associated chain of Order Handling components is empty for ODS). The Container calls each Order Processing Component before and after all Order Handling Components that are contained in its associated chain. Furthermore, after all resources have been called, the Container reverses Order Processing and calls all resources again that it has called before in reverse order. As a consequence, each Order Processing Component is called four times by the Container by its processOrder operation, while each Order Handling Component resource is called twice by the Container by its processOrder operation. The example in FIG. 8 shall help to clarify the way how Orders are processed. In the example, Order Processing starts at the Subscription resource. The fact that resources get the Order from the Container and hand over the Order back to the Container again after the execution of their associated Task is not shown in FIG. 8. Instead, the sequence of the involved resources that process the order is depicted: the path starts with the Subscription resource that gets the Order handed over from the Container (i.e. the Container calls the processOrder operation of Subscription), processes the Task and returns the Order back again (by calling the delegateOrder operation of the Container). The MeterEventLog resource is the second resource in the path. The Container hands over the Order to the MeterEventLog, which in turn processes and then returns the Order back again to the Container. Then the path continues with the ReportManager resource. The Subscription resource is the next resource in the path. This is the second time that the Subscription resource is called by its processOrder operation. Each Order Processing Component is called before and after its related Order Handling Component chain by the Container by its processOrder operation. In contrast to this, each Order Handling Component in the chain is only called once by the Container. The processing path then continues with the ODS resource. Although the Order Handling Component chain of ODS is empty, ODS is called twice (before and after the empty Order Handling Component chain). The path continues with Application, WebApplication, etc. Finally, the path ends up with the WebAppSrv resource. The Container detects the end of the path if it cannot find any related successor resource that it could hand over the Order (see herein "Order Processing Container" how the Container determines the resources along the processing path). At this point in time the Container reverses the order processing path and calls each resource again that it has called before in reverse order. In the example of FIG. 8, the Container starts the reverse path (which is also called Response Path in contrast to the Request Path that has been discussed so far) with the WebAppSrv resource. The WebAppSrv resource is called twice (before and after its empty Order Handling Component chain). Then the reverse path continues with the OSContainer resource, followed by the Server resource, the OSContainer resource again, the Application Tier resource, etc. The reverse path finally ends up with the Subscription resource. This also ends Order Processing for that Order.

As a result (as mentioned earlier), each Order Processing Component is called four times by the Container by its processOrder operation, while each Order Handling Component is called twice. As a consequence each Order Processing Component can subdivide the execution of its Task into four parts, while each Order Handling Component can subdivide the execution of its Task into two parts. It depends on the purpose of the Order and the individual Task how this subdivision must be done and it is up to the resource developer to make these decisions. Furthermore, all resources must keep an internal state in order to detect how often they have been called by its processOrder operation. There are no hints they get from the Order Processing Environment.

Finally, each resource must implement the operation destroy. This operation is called by the Container when it removes a resource from the Resource Topology. This is the last call the Container performs towards the resource. Then the Container removes the relationship to that resource from the Relationship Registry. From that point on the resource is treated by the Order Processing Environment as being removed and thus not existent. When being called with destroy the resource should remove all of its instance data.

Relations Between Resources

Relations between resources are stored in the Relationship Registry component of the Order Processing Environment. As the term "Relation" indicates, a relation connects two resources with each other in order to reflect a relationship between these resources with regard to the Resource Topology. Each edge in the Resource Topology graph is represented by a relation between two resources.

For the purpose of the present embodiment, each relation comprises of five attributes:

sourceHandle (a Resource Handle pointing to the first resource)

targetHandle (a Resource Handle pointing to the second resource)

sourceRole (role of the first resource)

targetRole (role of the second resource)

relationName (optional, can be used as name or stereotype for the relation)

The relation attributes sourceRole and targetRole define the roles of the related resources. There are two roles defined: Order Handling Component (H) and Order Processing Component (P). Valid combinations of (sourceRole, targetRole) include (P, P), (P, H), and (H, H). The combination (H, P) is invalid.

Relations are interpreted as directed connections between two resources. The direction of a relation expresses a parent-child relationship between two resources with regard to the underlying Resource Topology. The sourceRole attribute expresses the parent role of the resource that is defined by attribute sourceHandle, while the targetRole attribute expresses the child role of the resource defined by attribute targetHandle. The attribute relationName is optional and has no further purpose in the context of this embodiment.

In the context of this embodiment a Resource Handle is a pointer to a resource—either a direct reference to a resource or an indirect reference to a resource that must be resolved into a direct reference (the notion of direct and indirect references is, for example, mentioned in the Global Grid Forum Open Grid Service Infrastructure (OGSI)—direct references are called Grid Service References (GSR), and indirect references are named Grid Service Handles (GSH)). Another example for direct references are End Point References as defined in the WS-Addressing standard. In the context of this embodiment we assume that Resource Handles are unique for a resource instance so that they can be directly compared for the sake of simplicity of this description. But this does not restrict the generality of this embodiment. Comparisons, meaning the decision whether two Resource Handles point to the same resource instance, can be enhanced in a straightforward way since stateful resources have a unique resourceId: query the resources for the resourceId where the two Resource Handles point to. Then compare these two values.

Structure and Semantics of Orders

The Order is a document (e.g., XML) which includes a number of tasks for each involved resource without arranging those tasks in a sequence. The Task sequence is derived from the Resource Topology. This differentiates Orders from workflow definitions used by standard workflow engines.

There are three types of Orders: Initial Orders; Modification Orders and Termination Orders Initial Orders contain Tasks for building up an initial Resource Topology. Modification Orders can be processed on Resource Topologies that have been initialized by an Initial Order (e.g., a Modification Order includes Tasks for provisioning a new server to the existing system). A Termination Order is the last Order that can be applied to a Resource Topology. The purpose of this Order is to terminate all management actions, to clean up any storage that keeps state information which is not required anymore, and then remove all resources of a given Resource Topology.

In addition to the Order type, each Order has an Order name which identifies the specific Order. The resources interpret the Order type and the Order name in addition to their input parameters for deriving the Task that has to be performed. Each resource has an internal list of known Orders, identified by the Order type and the Order name. If a resource is called with an unknown Order then the resource shall perform no action and return the Order immediately to the Container.

Figure 9:
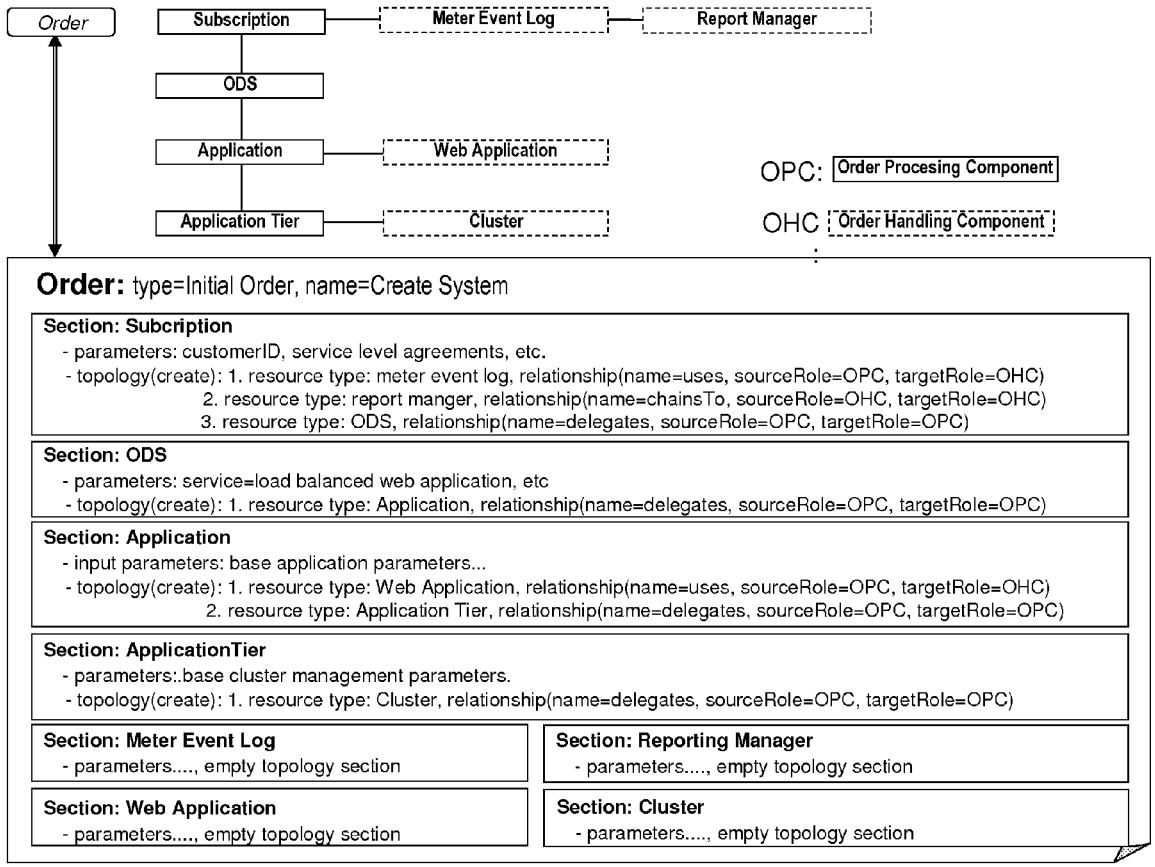
FIG. 9 shows the structure of an initial Order.

FIG. 9 shows an example of an Initial Order with the Order name "Create System". The Order is intended to build up a base Resource Topology as depicted at the top of the figure. The Order contains eight sections, one for each resource. A resource identifies its associated section in the Order by the section name which is the resource type identifier of the resource (e.g., section Subscription refers to the Subscription resource). Each section in the Order contains two subsections: the parameters subsection and the topology subsection. Both subsections can be empty.

A topology subsection defines a set of relationships and resources to be created or removed from the current Resource Topology starting from the current resource. The topology subsection includes:

A hint for the Container whether the mentioned relations and resources are to be created or removed by the values "create" and "remove", respectively.

A list of entries, one for each resource and relation that are to be created or removed. Each entry includes: the resource type of the resource that is to be created or removed, and definitions for the relation attributes "name", "sourceRole", and "targetRole".

All relations and resource definitions in a topology subsection of a resource X are interpreted relative to resource X. In the case that the resources and relations of the topology subsection shall be added to the Resource Topology, the topology subsection has following semantics: all listed Order Handling Components are appended via relations to the Order Handling Component chain of resource X in the same sequence as they appear in the list of entries which is mentioned in point 2 above. The listed Order Processing Component (if any) is directly connected to resource X via a relation. The mentioned relations are added to the Relationship Registry according to the definitions of the relation attributes in the topology subsection entries. The role of the new resources that are listed in the topology subsection entries is derived from the definition of the corresponding relation attribute targetRole since the listed new resources are always the targets of the relations that are defined in topology subsections.

FIG. 9 shows an example of an Initial Order that contains a section for resource Subscription. The related topology subsection for Subscription is repeated here:

Topology.create: (meaning the topology below is to be created and connected to Subscription)

resource type: meter event log,
relationship(name=uses, sourceRole=OPC, targetRole=OHC)

2. resource type: report manger,
relationship(name=chains, sourceRole=OHC, targetRole=OHC)

3. resource type: ODS,
relationship(name=delegates, sourceRole=OPC, targetRole=OPC) with OHC and OPC being short forms for Order Handling Component and Order Processing Component, respectively.

Figure 10:
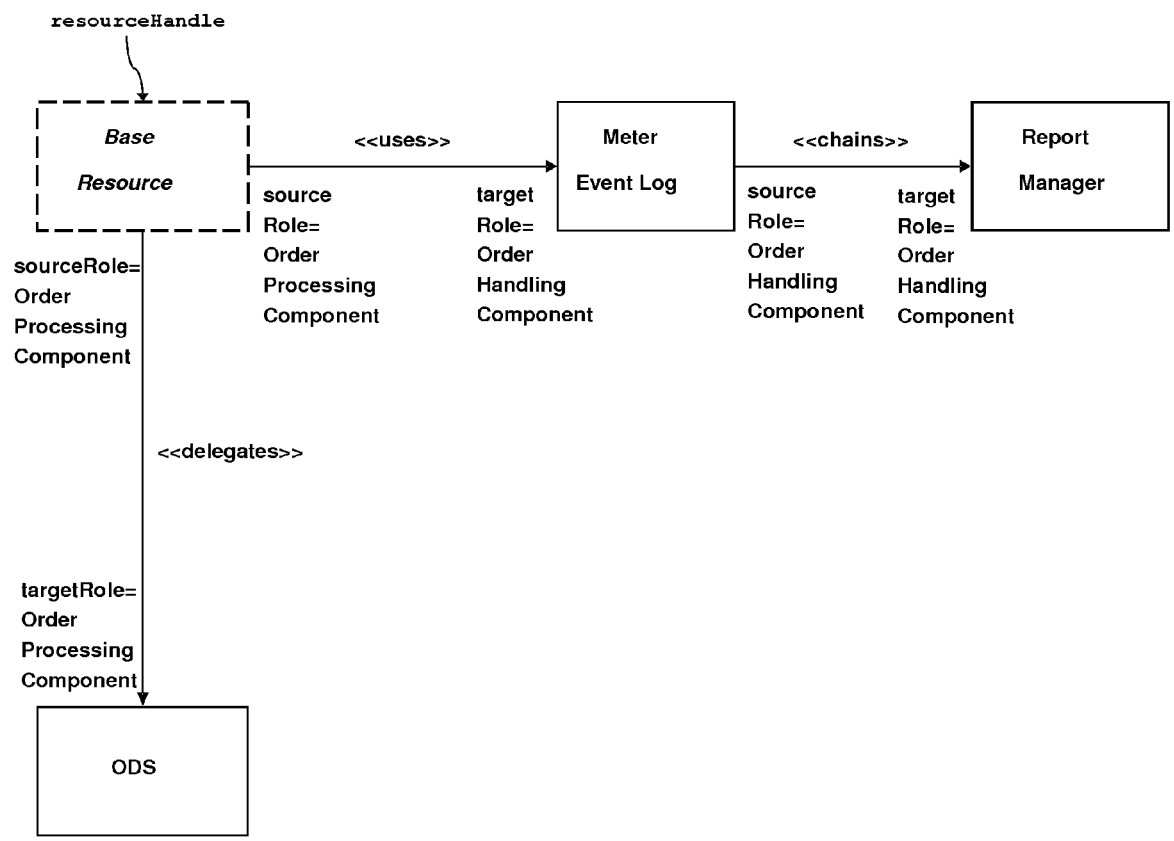
FIG. 10 shows an example of a Topology Subsection.

The semantics of the mentioned topology subsection example is that three new resources (Meter Event Log, Report Manager, and ODS) are to be created and added to the Subscription resource in the following way:

From point 1 in the list above can be derived that Meter Event Log shall act as an Order Handling Component since the relationship targetRole attribute is OHC. So the Meter Event Log will be appended to the Order Handling Component chain of the Subscription resource by a relation with name=uses, sourceRole=Order Processing Component, and targetRole=Order Handling Component, sourceHandle=Resource Handle of Subscription, and targetHandle=Resource Handle of Meter Event Log (see also FIG. 10). Meter Event Log is the first resource in the Order Handling Component chain of Subscription.

From point 2. in the list above can be derived that Report Manager shall act as an Order Handling Component since the relationship targetRole attribute is OHC. So the Report Manager will be appended to the Order Handling Component chain of the Subscription resource by a relation with name=uses, sourceRole=Order Processing Component, and targetRole=Order Handling Component. Since Meter Event Log has been listed before Report Manager, the Report Manager will be appended to the Meter Event Log, in other words: sourceHandle will point to Meter Event Log, and targetHandle will point to Report Manager (see also FIG. 10).

From 3. in the list above can be derived that ODS shall act as an Order Processing Component since the relationship targetRole attribute is OPC. So ODS will be connected directly to the Subscription via a relation with name=delegates, sourceRole=Order Processing, and targetRole=Order Processing Component, sourceHandle=Resource Handle of Subscription, and targetHandle=Resource Handle of ODS (see also FIG. 10).

Topology subsections that refer to removal of resources and relations are indicated by the hint "remove". The Container identifies the existing resources and relations that are to be removed by interpreting the topology subsections in much the same way as described above for creating new resources and relations. Topology sections for removal may have less information for identifying relations and resources as long as the definition of each entry leads to a unique result. Otherwise, the Container flags an error and refuses to apply the topology subsection to the current Resource Topology. Error handling is not part of this embodiment and is not discussed any further.

Relationship Registry

The Relationship Registry is part of the Order Processing Environment and stores relations between resources.

addRelationship(relation)—Adds a new relation to its internal storage.

removeRelationships(resourceHandle)—Removes all relations with relation.sourceHandle=resourceHandle or relation.targetHandle=resourceHandle from its internal storage. In the context of this embodiment we assume that Resource Handles can be compared directly.

findRelatedTargetsByRole(startHandle,targetRole): ResourceHandle[ ]—Retrieves all relations that are contained in the internal storage with relation.sourceHandle=startHandle and relation.targetRole=targetRole and returns the value of relation.targetHandle for all relations that have been found as an array of Resource Handles. The length of the array may be zero if no relations can be found for the requested criteria.

Factory Registry

The Factory Registry is part of the Order Processing Environment and stores for each resource type one Resource Handle that points to a resource factory for that resource type. In the context of this embodiment it is assumed that each resource factory provides a create operation without parameters which instantiates a new resource instance for the given resource type and which returns the Resource Handle of the new resource. In order to take part in Order Processing the new resource must support Order Processing.

We define a resource factory as a resource that provides an operation create which creates a new resource instance of a fixed resource type each time when being called. The create operation has no arguments and returns the Resource Handle to the new resource instance that has been created. This can be compared to a simplified view of factories in real life: assume we have a set of car factories where each factory can only produce one model. Compared to this picture the Factory Registry is a list of car factories where each entry contains the location information of the factory and the related model that the factory produces. For ordering a new model X car we query the Factory Registry in order to find out which factory produces this model, go this factory, and finally request the assembly (or "creation") of a new model X car. If the company decides to add new or remove old car models then the list of factories is updated accordingly. The company could also decide to move production of an existing model to a different factory. This situation can also be handled by simply updating of the factory list.

It should be noted that the create operation of a resource factory creates a resource (more precisely, a management representation of a real IT resource) in an initial state. This resource turns into an active state later when it processes the Initial Order.

The Factory Registry provides following operations:

registerFactory(resourceType, factoryHandle)—Adds a new Resource Handle factoryHandle that points to a resource factory to its internal storage together with the associated resource type resourceType.

deRegisterFactory(resourceType)—Removes the resource factory for resource type resourceType from its internal storage.

getFactoryForResourceType(resourceType): ResourceHandle

Order Processing Container

The Order Processing Container ("Container") is part of the Order Processing Environment and drives Order Processing. Order Processing starts when the Container is called by its asynchronous operation startOrder. It is outside of the scope of this embodiment how Orders are generated and which system calls the startOrder operation. The startOrder operation has two parameters: the Order and the Resource Handle that points to the first resource in the Resource Topology where Order Processing is to be started. Order Processing always assumes an existing resource acting as an Order Processing Component as the starting point. This resource might be created by earlier Orders or it is created by an external system.

In order to simplify the description of the Container actions, following terms and background information are used:

Term: "Container connects resource Y to resource X according to the current topology subsection entry", meaning: the Container adds a new relation as specified by the relation attributes of the topology subsection entry to the Relationship Registry by calling its addRelationship operation. The new relation connects resources X and Y where resource Y is the target resource of the relationship.

Term: "Container removes resource X from Resource Topology", meaning: the Container calls operation removeRelationships of the Relationship Registry with a Resource Handle that points to resource X in order to remove all relationships with resource X. Then the destroy operation of resource X is called by the Container.

Term: "Container instantiates a new resource of resource type T", meaning: the Container queries the Factory Registry for a Resource Handle that points to the resource factory for resource type T by calling the operation getFactoryForResourceType of the Factory Registry. Then the Container calls the create operation of this factory. The create operation creates a new resource instance of resource type T and returns a Resource Handle that points to the new resource.

Term: "Container traverses to the next Order Processing Component", meaning: based on a "current" resource X the Container searches for the next resource with role Order Processing Component in the Resource Topology by querying the Relationship Registry with a call findRelatedTargetsByRole and passing a Resource Handle that points to resource X as startHandle parameter for the search and passing role "OrderProcessingComponent" as targetRole parameter. The Relationship Registry responds with an array of Resource Handles that reflects the search result. If exactly one resource is found then the Container treats this resource from now on as "current" resource. Finding no resources is a valid result and is treated by the Container as described in the explanation of the Order Processing loop in the text below. In order to simplify the description of the Container actions it is assumed that if there is more than one resource found then the Resource Topology is treated as being built up incorrectly and the Container would stop Order Processing. Error handling is not part of this embodiment and is not discussed any further.

Term: "Container traverses to the next Order Handling Component", meaning: like point 4 above but using target role "OrderHandlingComponent" instead of using target role "OrderProcessingComponent".

Figure 11:
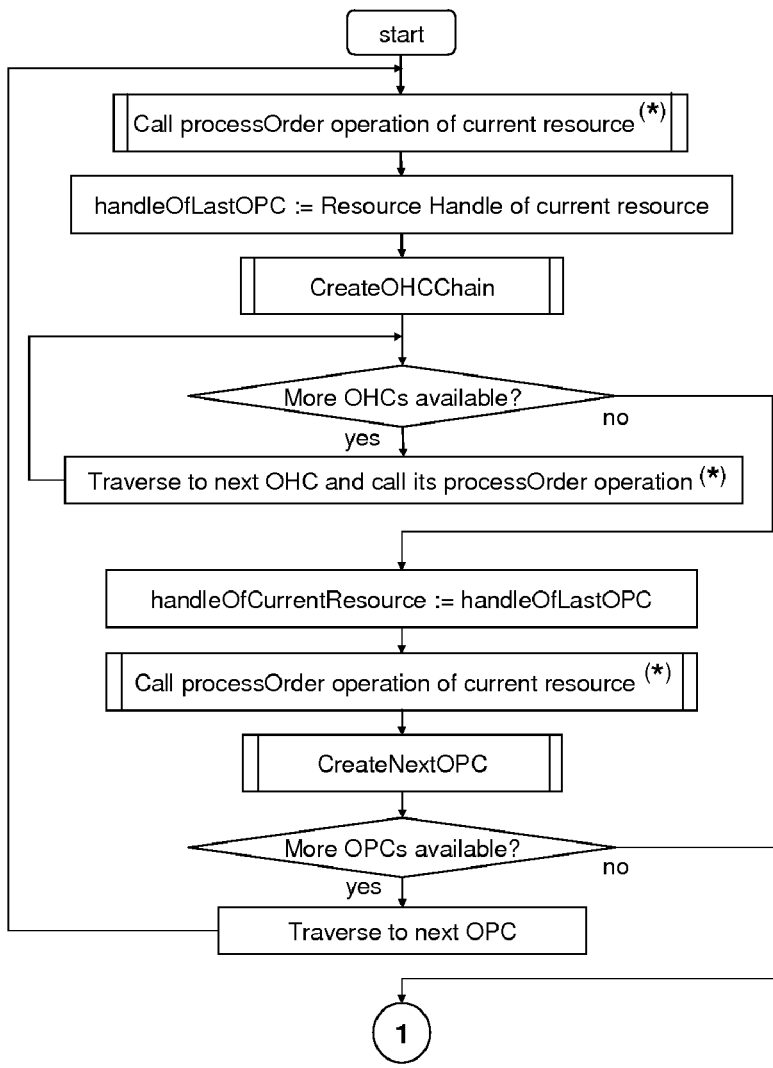
FIG. 11 shows an Order Processing Loop of Container—Request Path.
Figure 12:
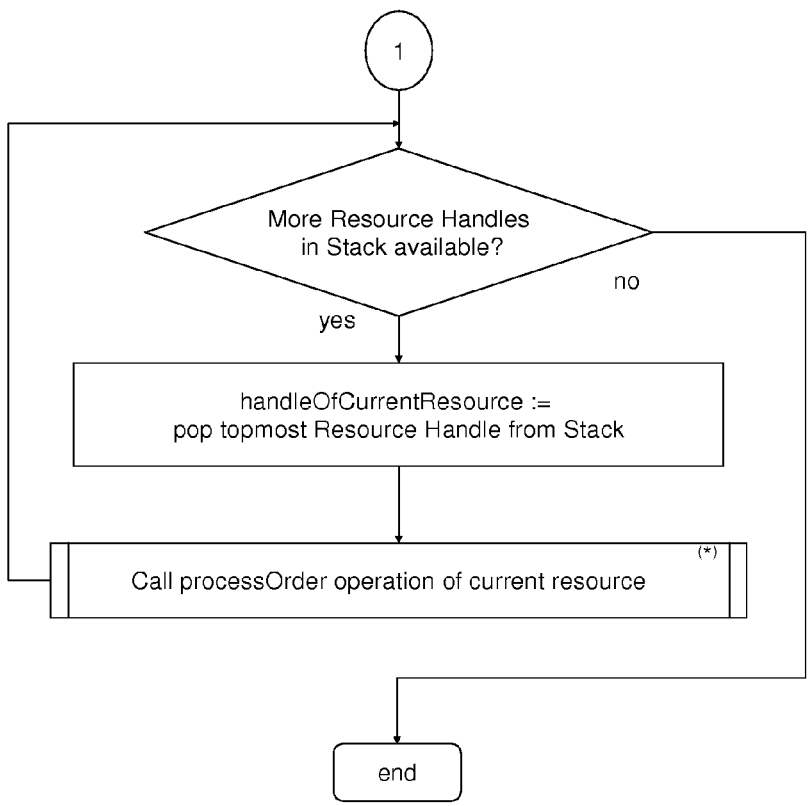
FIG. 12 shows an Order Processing Loop of Container—Response Path.
Figure 13:
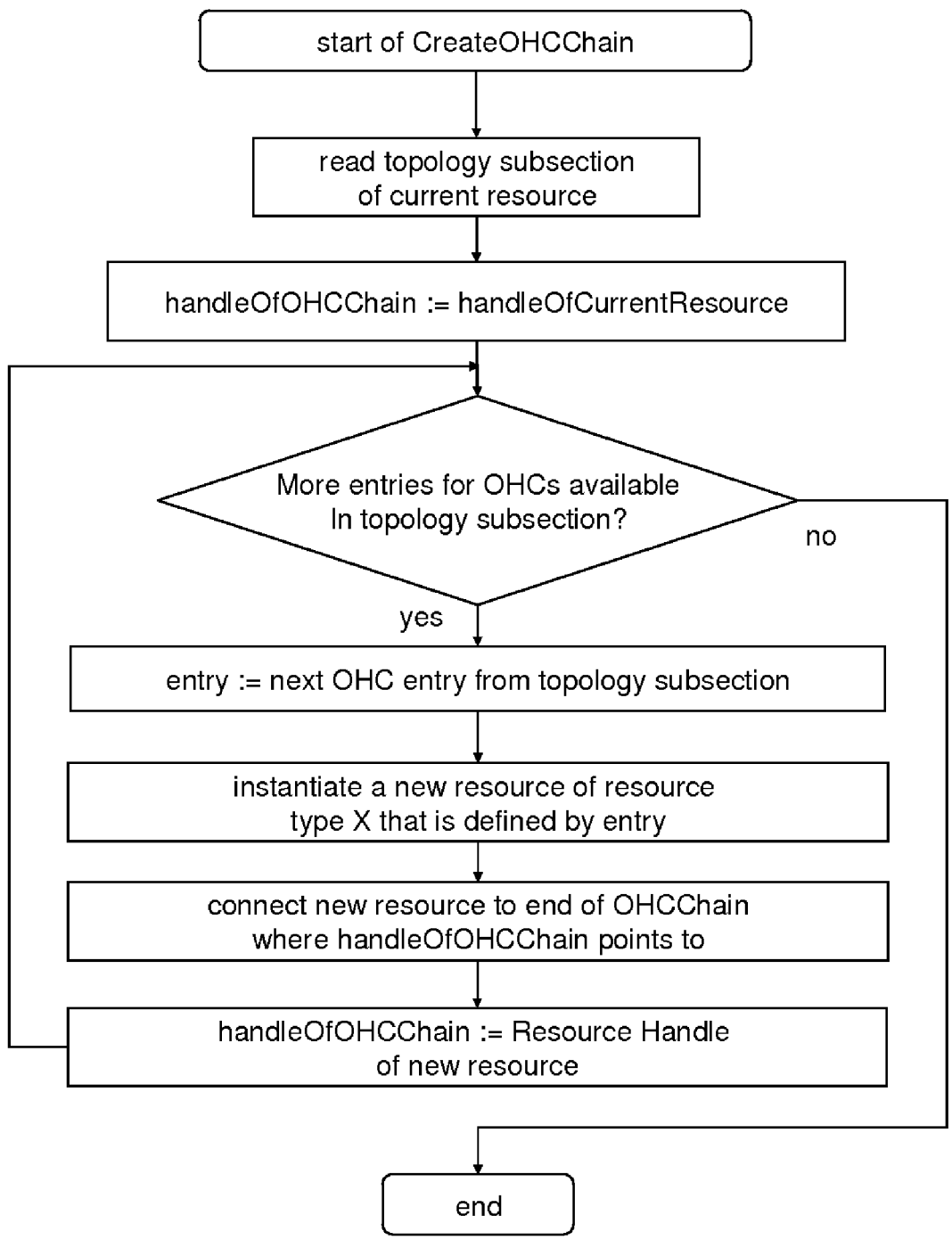
FIG. 13 shows a Subroutine CreateOHC.
Figure 14:
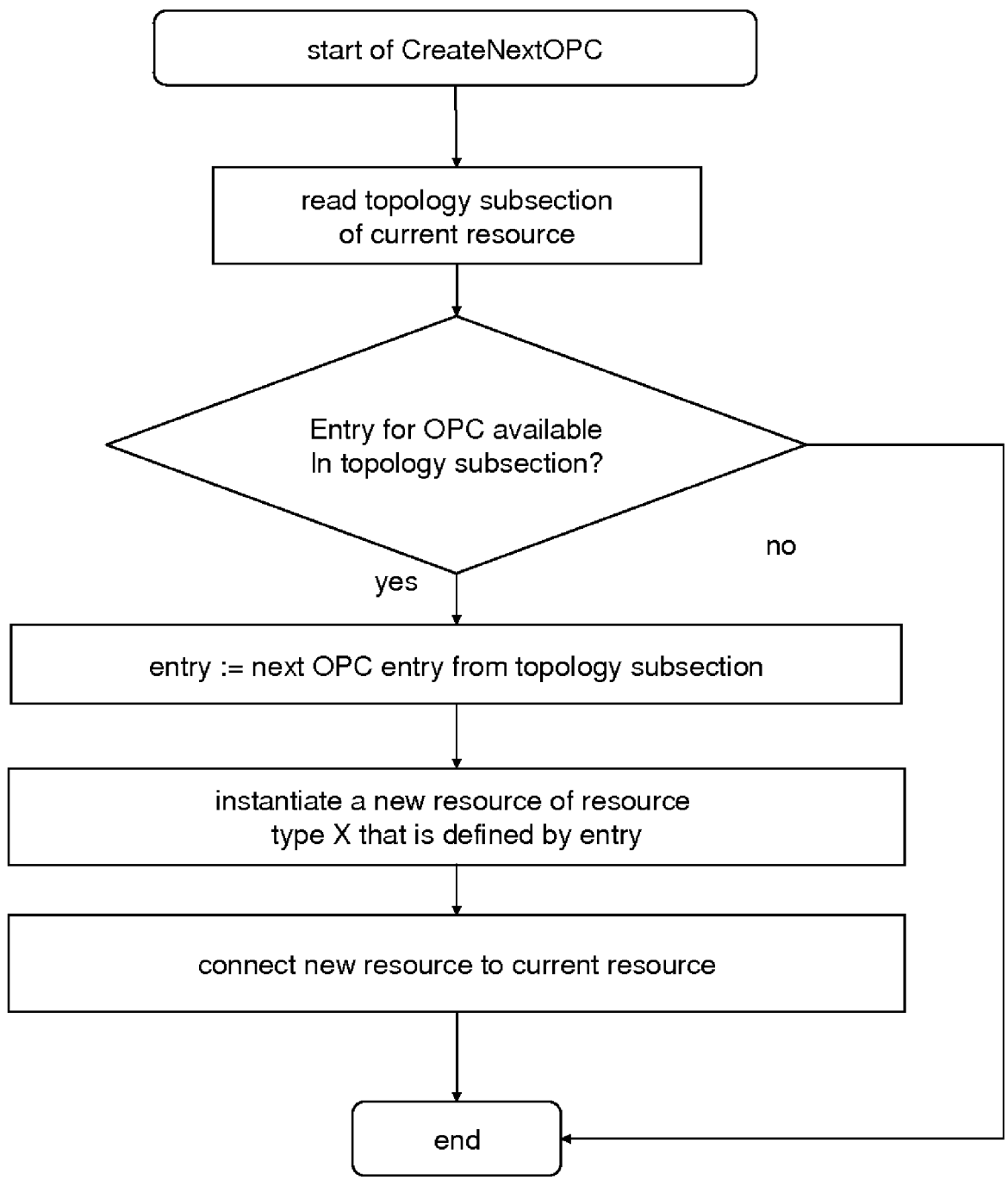
FIG. 14 shows a Subroutine CreateNextOPC.

FIGS. 11 to 14 depict the flow charts of the Container actions during Order Processing. Order Processing is started by calling the startOrder operation of the Container with two parameters: the Order that is to be processed and the Resource Handle that points to the first resource in the Resource Topology where Order Processing is to be started. FIG. 11 shows the Request Path and FIG. 12 the Response Path of Order Processing. FIGS. 13 and 14 depict the flow charts of subroutines CreateOHCChain and CreatNextOPC, respectively.

Comments to FIG. 11: The flow chart starting point correlates to the call of the startOrder operation of the Container. The Container calls the asynchronous operation processOrder of the current resource (as defined by the Resource Handle parameter of the startOrder operation). The resource in turn processes the Order and finally hands over the (updated) Order back to the Container again by calling its asynchronous operation delegateOrder. This is not depicted in the flow chart—we treat the situation in the flow chart as if processOrder would be a synchronous call that finally returns the (updated) Order. The Container saves the Resource Handle of the current resource now to its variable handleOfLastOPC and then calls the subroutine CreateOHC chain. This subroutine creates and adds all Order Handling Components to the Order Handling Component chain of the current resource. Then the Container traverses to all available Order Handling Components in the Order Handling Component chain and calls their processOrder operations subsequently in the sequence that is given by the Order Handling Component chain. In the next step the Container restores the Resource Handle of the last Order Processing Component that the Container has called before traversing the Order Handling Component chain and treats this resource as the "current" resource. The Container now calls the current resource a second time by its processOrder operation. When finished the Container calls the subroutine CreateNextOPC which connects the next Order Processing Component to the current resource if the Container can find an entry for it in the topology subsection of the current resource and traverses to that resource it has found. Otherwise, if the Container cannot find another Order Processing Component in the topology subsection, the Request Path is terminated. In addition to the described actions, the Container stores the Resource Handle of each called resource into its internal stack. This stack is used during the Response Path for traversing through all resources the Container has called before in reverse order.

Comments to FIG. 12: this flow chart depicts the Container actions for processing the Response Path of Order Processing. The Container queries its internal stack for traversing through all resources the Container has called before in reverse order. In each iteration of the loop the topmost stack entry is read and removed from the stack. The stack contains the Resource Handles of all the resources that have been called in the Request Path. The fact that each Order Processing Component has been called twice during the Request Path is reflected accordingly by two stack entries for Order Handling Components (one before and the other after the entries for the Resource Handles of the resources of the Order Handling Component chain).

Comments to FIG. 13: This flow chart depicts the actions of subroutine CreateOHCChain for building up the Order Handling Component chain for the current resource which is always an Order Processing Component. The Container instantiates and then connects the Order Handling Components to the last Order Handling Component in the chain (or directly to the current resource at the beginning) according to the entries in the topology subsection of the current resource.

Comments to FIG. 14: This flow chart depicts the actions of subroutine CreateNextOPC. The Container reads the topology section of the current resource which is always an Order Processing Component. If the Container finds on entry for a new Order Processing Component then the Container instantiates the Order Processing Component according to the topology subsection entry for that component and connects it to the current resource. At the end of the Request Path the Container will not find a next Order Processing Component in the topology section of the current resource anymore.

Extension of the Order Processing Environment

In order to keep the description of the Order Processing Environment simple we made the restriction that branching points in the Resource Topology where more than one Order Processing Component is connected to another Order Processing Component are not allowed. This is an unacceptable restriction for real applications which is resolved as described herein.

In order to allow for the mentioned branching points, the delegateOrder operation of the Container is enhanced by an additional parameter targetOPCHandle which is set by the resource that calls the operation and which determines the next resource to be called by the Container for Order Processing. In that manner, a resource can determine where to go next at a branching point. Only resources that are Order Processing Components are allowed to redirect Order Processing to other Order Processing Components in this way. If the new parameter targetOPCHandle is left empty, then delegateOrder acts as before.

Furthermore, the Container functionality is enhanced in the following way: if the Order Processing is already processing the Response Path, then a call of delegateOrder with a defined Resource Handle for targetOPCHandle instructs the Container to switch back to the Request Path traversal mode again and to traverse the new path starting with the resource where targetOPCHandle points to. In this manner, Order Processing can traverse through multiple sub-paths starting from a branching point.

Additionally, Order Processing can also "jump" from one resource to another (even if they are not related in the Resource Topology) since targetOPCHandle can be any Order Handling Component in the Resource Topology.

As a further extension of the Order Processing Environment two additional operations are added to the Container: createTopology and deleteTopology. These two operations enable resources to instruct the Container to modify the Resource Topology. For this purpose, the structure of the Order is extended by allowing topology sections to be defined outside of the resource-specific Task sections in the Order. Each of these topology sections is marked with an individual identifier that differs from section names of resource-specific Task sections. The structure and semantics of this new kind of topology sections is the same as the structure and semantics of the known topology subsections for resources.

The signatures of the new Container operations are as follows:

createTopology(baseHandle, topologySectionName, Order)

deleteTopology(baseHandle, topologySectionName, Order)

The first parameter baseHandle points to the resource that shall be taken as the base node for topology modification (create or delete). The parameter topologySectionName defines the topology section in the Order to be used. The last parameter is the Order.

Figure 15:
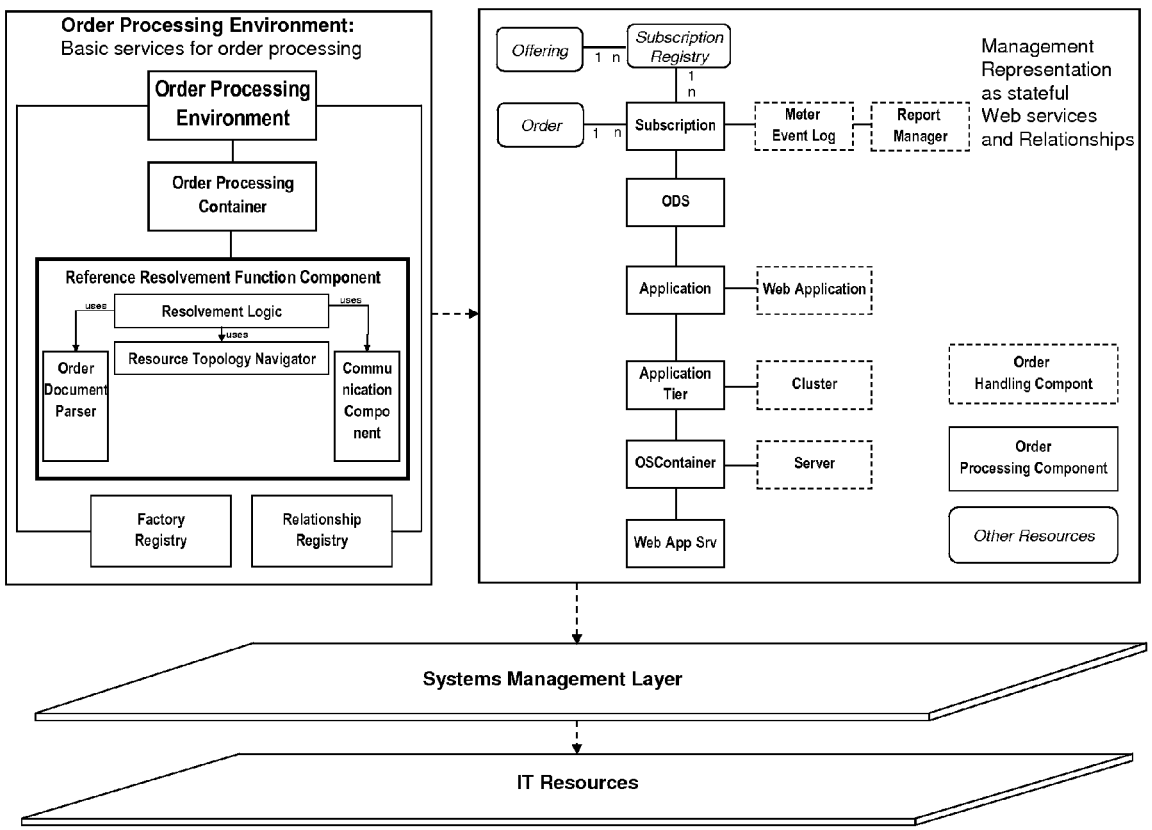
FIG. 15 shows an embodiment of the Order Processing Environment.

The present embodiment extends the Order Processing Environment described in detail above by an additional component named Reference Resolvement Function Component (RRFC) as depicted in FIG. 15. It provides the basic functionality for resolving References defined in the Order Document at runtime and make the referenced data available as usual input parameter for the resources involved in the Order Processing.

Topology Sections in Order Documents

An Order Topology Section in an Order defines a set of relationships and resources to be created or removed. In this embodiment, we extend the definition of a Topology Section in the Order in such a way, that relationships between existing resources can be defined or deleted. Again, the Container interprets the Topology Section and adds a new relation to the Relationship Registry or deletes it from the Relationship Registry.

As introduced above, each relation comprises of the attributes sourceHandle, targetHandle, sourceRole, targetRole and relationName. Also, only two roles are introduced: Order Handling Component (H) and Order Processing Component (P). In this embodiment the defined roles are extended in such a way, that arbitrary roles may be defined for relation between already existing resources.

The following example shows a Topology Section definition for an additional relation between the two existing resources ERP Application Server and ERP System (ERP stands here for an Enterprise Resource Planning system):

relationship(name=centralinstance,
sourceRole=isERPApplSrvOf,
targetRole=isERPSystemOf,
sourceHandle=Resource Handle pointing to the ERP Application Server resource instance,
targetHandle=Resource Handle pointing to the ERP System resource instance)

Figure 16:
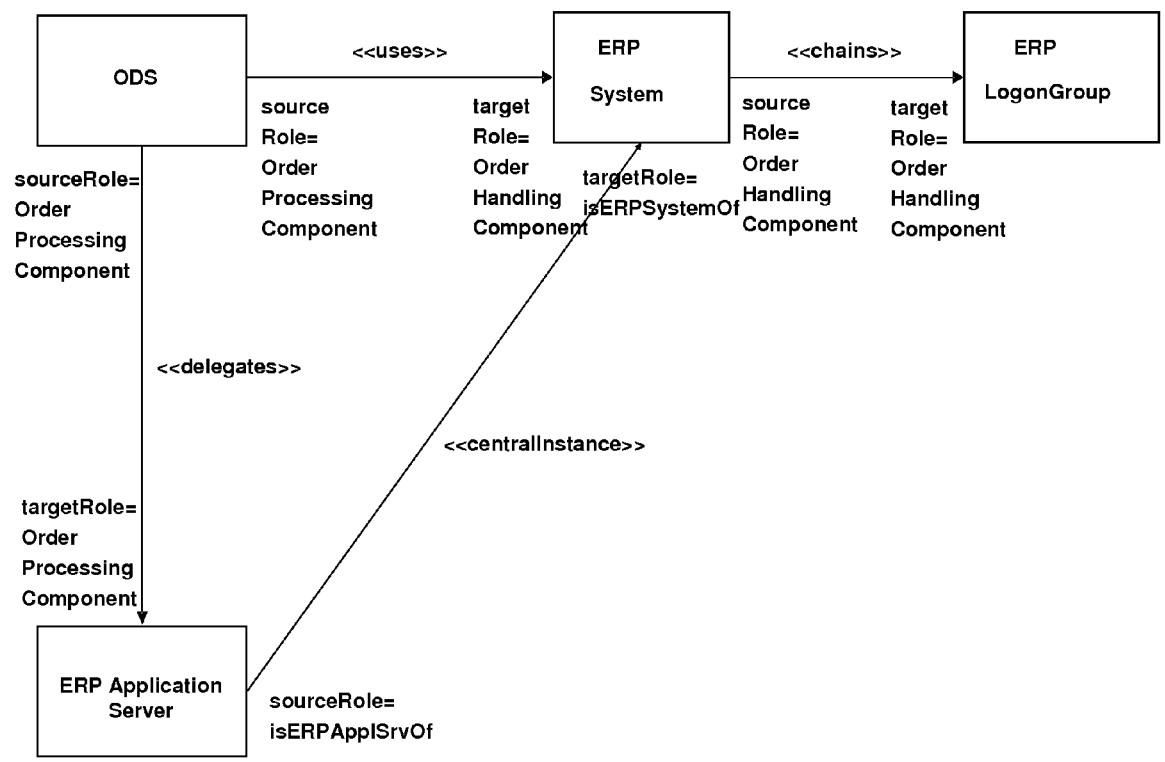
FIG. 16 shows an additional relationship as created by an embodiment of the present invention.

FIG. 16 shows the additional relationship that was defined by the Container (using the Topology Section definition in the last example) by adding it to the Relationship Registry.

Usage of Resource Property References in the Order Document

Resource Property References are pointers (indirect references) to Resource Properties of resource instances. These references consist of a Resource Type identifier of a resource (e.g. Resource Type Subscription refers to the Subscription resource), an optional Resource Instance Name Identifier of a resource and a Resource Property name. Resource Type and Resource Instance Name are used by the RRFC to identify the correct resource instance in the resource topology tree. The usage of Resource Instance Name is optional. If more than one resource instance of the same Resource Type are referenced by Resource Property References, the Resource Instance Name has to be used as additional information to identify the correct instance. The pair (Resource Type, Resource Instance Name) must be unique for all resource instances that are involved in processing of one Order.

Depending on the Resource Property name, either the operation getResourceProperty or getMultipleResourceProperties (both operations are defined in the Ws-ResourceProperties standard) is called to get the required resource property values from the resource instance. The resource property name may contain wildcards to specify not only one resource property name, but multiple. In this case the identified resource instance is queried first by calling the operation getMultipleResourceProperties.

Figure 17:
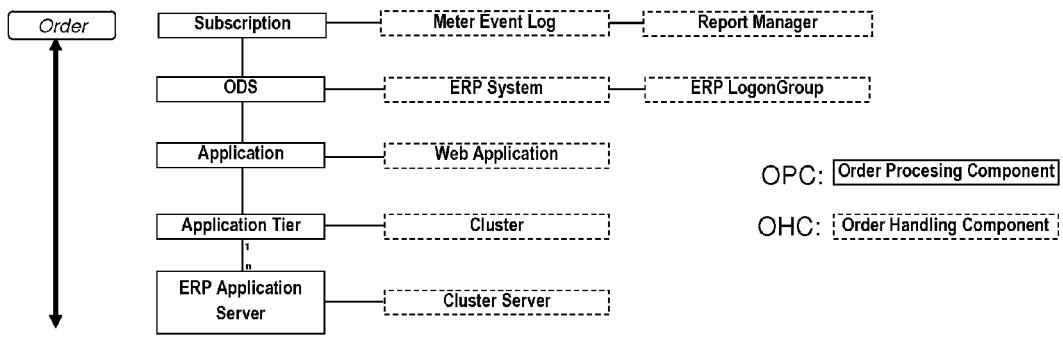
FIG. 17 shows Resource Property References as defined by an embodiment of the present invention.

Finally, the Resource Property Reference in the Order Document is replaced by these values. The sample depicted in FIG. 17 shows three Resource Property References defined in the Order Document. The first two, named clusterID and ERPSystemID, are defined by specifying only the Resource Type name and the Resource Property name. They are resolved by the RRFC as soon as the resource instance with Resource Type Cluster and ERPSystem, respectively, has finished its Order Processing on the request path. The third resource property reference, named ERPApplSrvIPAddress, is defined by not only specifying the Resource Type name, but also the Resource Instance Name. This is necessary in this example because more than one resource instances of the same Resource Type ERPApplicationServer may exist in the resource topology tree, so just specifying the Resource Type would possibly not be sufficient for the identification. Also, it is important to mention that the third Resource Property Reference can not be resolved on the Request Path, but only on the Response Path of the Order Processing. The requested property IP Address is not available when the ERP Application Server is called the first time for its Order Processing, but only when the Cluster Server resource has performed its Order Processing (Provisioning action) which happens after the ERP Application Server was called.

Usage of Resource Property Relationship References in the Order Document

Resource Property Relationship References are pointers (indirect references) to Resource Properties of resource instances. These references consist of a Resource Type, an optional Resource Instance Name, one or multiple Relation Names and a Resource Property name. Resource Type and Resource Instance Name are used by the RRFC to identify the correct resource instance in the resource topology. Starting from that identified resource instance, the resource tree is traversed to find the specified target resource instance by using the relation name information contained in the Reference.

Depending on the Resource Property name, either the operation getResourceProperty or getMultipleResourceProperties is called to get the required resource property values from the resource instance. The resource property name may contain wildcards to specify not only one Resource Property name, but multiple. In this case the identified resource instance is queried first by calling the operation getMultipleResourceProperties. Finally, the Reference in the Order Document is replaced by these values.

Figure 18:
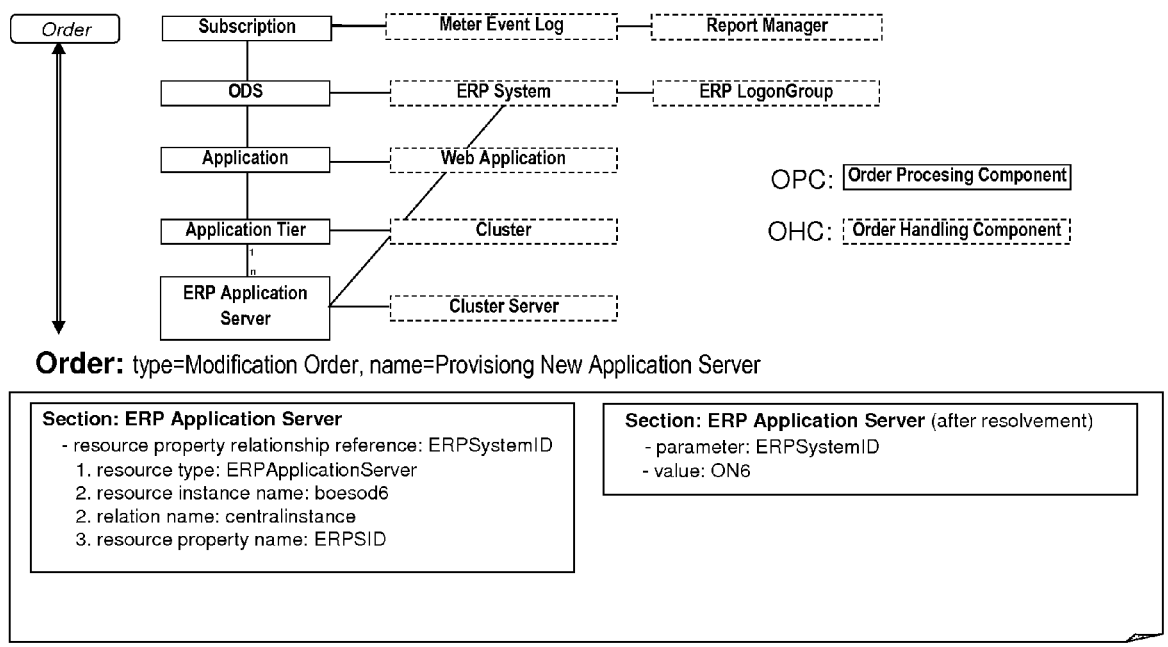
FIG. 18 shows Resource Property Relationship References as used by an embodiment of the present invention.

The sample depicted in FIG. 18 shows one Resource Property Relationship Reference named ERPSystemID, consisting of a Resource Type name, a Resource Instance Name, one Relation Name and the Resource Property name. This reference is resolved by the RRFC before the Container calls resource instance ERP Application Server.

Reference Resolvement Function Component

The Reference Resolvement Function Component (RRFC) consists internally of the Resolvement Logic, the Resource Topology Navigator, the Order Document Parser and the Communication Component (please see FIG. 15). The RRFC is called by the Container during the Order Processing before the Order Document is delegated to the next resource. The Order Document, the Resource Handle of the component that has just finished its Order Processing (source handle), and the Resource Handle of the resource that is to be called next (target handle) are provided as arguments by the Container to the RRFC. The Resolvement Logic of the RRFC first starts its stateful resolvement operation for resolving all Resource Property References in the Order Document that refer to Resource Properties of the resource identified by the source handle. For this purpose it uses the Order Document Parser to find all appropriate Resource Property References in the Order Document. Having the list of References available, the Resolvement Logic uses the Communication Component to call the operations getResourceProperty or getMultipleResourceProperties (depending on the found Reference) on the resource specified by the source handle. It uses then again the Order Document Parser to replace the Resource Property References in the Order Document with the acquired Resource Property values. After having resolved all Resource Property References, the Resolvement Logic of the RRFC starts its stateful resolvement operation for resolving all Resource Property Relationship References in the Order Document based on the target handle. The Resolvement Logic basically performs the same steps as for resolving the Resource Property References, but uses additionally its Resource Topology Navigator which in turn interacts with the Relationship Registry to find the target resources by traversing the resource tree using the relation name information contained in the Resource Property Relationship References. It then uses its Communication Component to call the operations getResourceProperty and getMultipleResourceProperties on the target resources and replaces finally the References in the Order Document by the help of the Order Document Parser with acquired Resource Property values.

So before the Container delegates the Order Document from a resource instance named Resource_1 to a resource instance named Resource_2, the RRFC resolves on one hand all Resource Property References that, by using Resource Type and optionally Resource Instance Name, specify properties of Resource_1. On the other hand, the RRFC substitutes also all Resource Property Relationship References to Resource Properties relative to Resource_2, specified by one or multiple relationships starting from Resource_2.

Example for resolving Resource Property References is given in FIG. 17. In FIG. 17, one Resource Property Reference is defined named ERPSystemID. This Reference specifies ERPSystem as Resource Type name. Before the Container delegates the Order Document from the resource instance ERP System to the next resource instance, in the example ERP LogonGroup, the RRFC is called by the Container to resolve all Resource Property References that specify properties of the resource instance ERPSystem. The RRFC looks trough the Order Document and detects the Reference ERPSystemID. It then queries the Resource Property ERPSID by calling the operation getResourcProperty on the ERPSystem resource. The Reference in the Order Document is finally replaced by the value returned and the RRFC gives the control back to the Container.

Example for resolving Resource Property Relationship References is given in the FIG. 18. In FIG. 18, one Resource Property Relationship Reference is defined named ERPSystemID. This Reference specifies ERPApplicationServer as Resource Type name, boesod6 as Resource Instance Name, and central instance as Relation Name. Before the Container delegates the Order Document from the resource instance Application Tier to the next resource instance ERP Application Server, the RRFC is called by the Container to resolve all Resource Property Relationship References that specify properties relative to resource instance ERP Application Server, meaning all References that reference ERP Application Server as starting point, and define one or more Relation Names to specify the target resource instance. The RRFC looks through the Order Document and detects the Reference ERPSystemID. It would then query the Relationship Registry for the resource that has the relation with Relation Name.

centralinstance with the resource instance ERP Application Server. Finally, it would query the Resource Property ERPSID from that resource, replacing the Reference in the Order Document and give the control back to the Container. The interface of the resolvement operations are:

resolveResourcePropertyRefs(orderDocument,sourceHandle): The parameter sourceHandle reflects the current transition in the Systems Management Flow: sourceHandle refers to the last resource that has processed the Order. The RRFC searches through the Order Document and resolves all Resource Property References pointing to properties of the resource instance specified by sourceHandle.

resolveResourcePropertyRelRefs(orderDocument,targetHandle): The parameter targetHandle reflects the current transition in the Systems Management Flow: targetHandle refers to the next resource that is to be called by the Container to process the order. The RRFC searches through the Order Document and resolves all Resource Property Relationship References pointing to properties of the resource instance specified by targetHandle.

Resolvement Method ResolveResourcePropertyRefs
Algorithm:
resolveResourcePropertyRefs(orderDocumentTaskSections, sourceResourceHandle, sourceResourceType, sourceResourceInstanceName)

This algorithm assumes, as already described, that the Order Document consists of Task sections. Each Task section may contain further subsection. Each subsection may be divided again in sub subsection and so forth. An API exists that can be used to work in an appropriate way with the Order Document.

Figure 19:
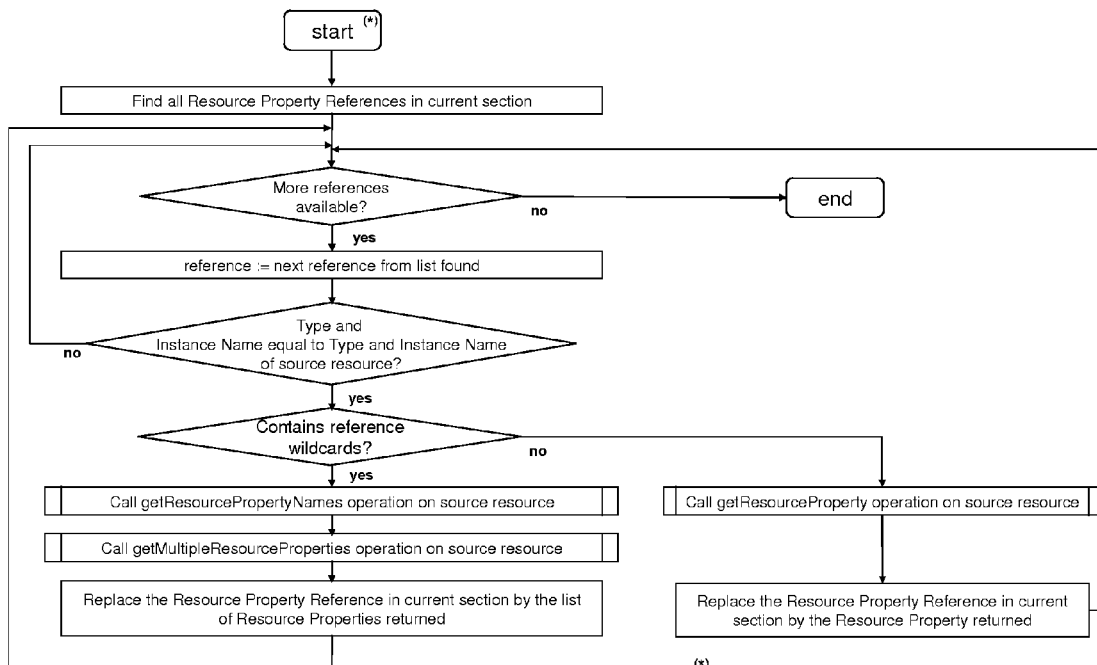
FIG. 19 shows a Subroutine resolveResourcePropertyRefs as provided by an embodiment the present invention.

Explanation of the algorithm: The RRFC calls internally its private resolvement operation by passing the list of Task sections in the Order Document and the source Resource Handle, Resource Type and Resource Instance Name as parameters. For each section in the section list, it performs the steps described in the following algorithm (the algorithm is also depicted in FIG. 19):

Algorithm specification: Find all fields in the current section with usage type ResourcePropertyRef. For each resource property reference field found in step 1 check whether the specified resource type and instance name match with the operation arguments sourceResourceType and sourceResourceInstanceName.

For each resource property reference field found in step 2 that contains no wildcard characters in its resource property name part call the operation getResourceProperty (pass the resource property name as argument) on the resource instance specified by sourceResourceHandle and replace the reference field value by the property value returned in the order document section.

For each resource property reference field found in step 2 that contains wildcard characters in its resource property name part do the following steps Call the operation getResourcePropertyNames (pass the resource property name mask which is defined in the resource property name part of the reference as argument) on the resource instance specified by sourceResourceHandle Call the operation getMultipleResourceProperties (pass the resource property names returned in the previous step as argument) on the resource instance specified by sourceResourceHandle Delete the resource property reference field from the order document For each resource properties returned in step b, add a new field containing the resource property value in the order document section.

Get the list of subsections contained in the current section and call (recursive) the private resolvement operation by passing this list as new argument value.

Resolvement Method ResolveResourcePropertyRelRefs
Algorithm:
resolveResourcePropertyRelRefs(orderDocumentTaskSections, sourceResourceHandle, sourceResourceType, sourceResourceInstanceName)

This algorithm further assumes, as already described, that there is a Relationship Registry that holds all relations between resources and that can be queried for retrieving resources.

Figure 20:
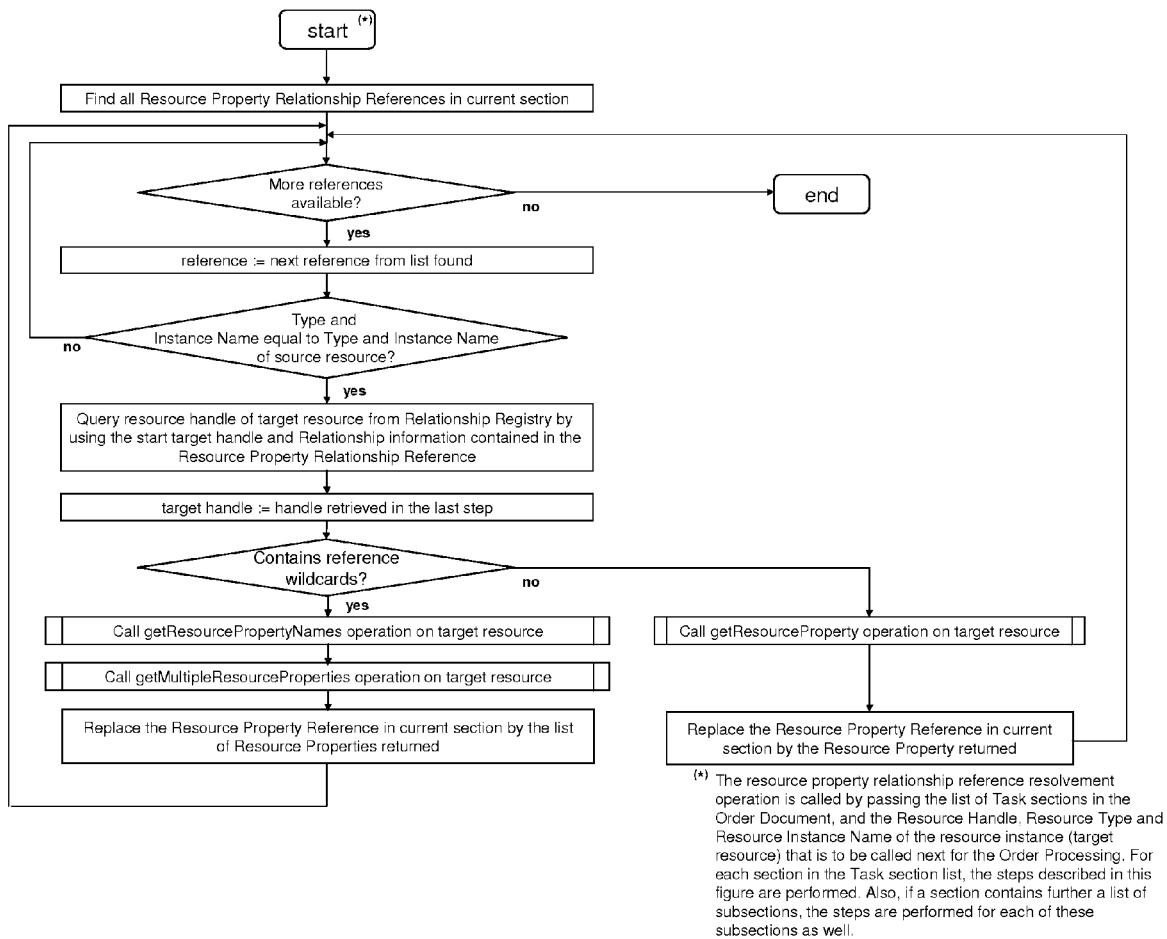
FIG. 20 shows a Subroutine resolveResourcePropertyRelRefs as provided by an embodiment of the present invention.

Explanation of the algorithm: The RRFC calls internally its private resolvement operation by passing the list of sections in the Order Document and the source Resource Handle, Resource Type and Resource Instance Name as parameters. For each section in the section list, it performs the steps described in the following algorithm (the algorithm is also depicted in FIG. 20):

Algorithm specification: Find all fields in the current section with usage type ResourcePropertyRelRef.

For each resource property relationship reference field found in step 1 check whether the specified resource type and instance name match with the arguments sourceResourceType and sourceResourceInstanceName.

For each resource property relationship reference found in step 2 considers its relation name information; for each relation name contained perform the following two steps:

retrieve the resource handle of the next resource instance from the relationship registry by calling the operation findRelatedTargetsByRelationName (pass the sourceResourceHandle and the relation name as arguments)

Store the retrieved resource handle as new source resource handle—For each resource property relationship reference field found in step 2 that contains no wildcard characters in its resource property name part call the operation getResourceProperty (pass the resource property name as argument) on the resource instance specified by sourceResourceHandle and replace the reference field value by the property value returned in the order document section.

For each resource property relationship reference field found in step 2 that contains wildcard characters in its resource property name part do the following steps: Call the operation getResourcePropertyNames (pass the resource property name mask which is defined in the resource property name part of the reference as argument) on the resource instance specified by sourceResourceHandle and Call the operation getMultipleResourceProperties (pass the resource property names returned in the previous step as argument) on the resource instance specified by sourceResourceHandle Delete the resource property reference field from the order document For each resource properties returned in step b, add a new field containing the resource property value in order document section.

Get the list of subsections contained in the current section and call (recursive) the private resolvement operation by passing this list as new argument value.

Resource Property Query Interface

In order to be able to resolve References, either Resource Property References or Resource Property Relationship References, the resources have to provide the following operations (the operations getResourceProperty and getMultipleResourceProperties are defined in the Ws-ResourceProperties standard): getResourceProperty(resourcePropertyName): This synchronous operation is invoked by the RRFC in order to get the value of a certain Resource Property when resolving a Reference in the Order Document. The resource checks whether it provides that Resource Property and returns either the corresponding value or throws an exception.

getMultipleResourceProperties(resourcePropertyNames):

This synchronous operation is invoked by the RRFC in order to get the values of all specified Resource Properties when resolving a Reference in the Order Document. The resource checks whether it provides the Resource Properties and returns either the corresponding values or throws an exception.

getResourcePropertyNames(wildcardString): This synchronous operation is invoked by the RRFC in order to get the names of all Resource Properties specified by the argument wildcardSring when resolving a Reference in the Order Document. The resource returns either the list of resource property names matching the wildcardString or an empty list if it provides no Resource Properties that match the wildcardString.

Comparison Between Resource Property References and Resource Property Relationship References Both Resource Property References and Resource Property Relationship References are indirect references to Resource Properties of a resource instances.

Resource Property References are resolved by the RRFC when the referenced resource instance has finished its Order Processing. In other words, these are backward references that can only be used if the referenced resource instance participates on the Order Processing, and not before that instance has finished its Order Processing. Also, these references are resolved, by early binding, immediately after the referenced resource has finished its Order Processing, but not at the time used by other resource instances.

On the other hand, Resource Property References do not require specifying resource topology information and hence are independent from changes in the resource topology tree.

Resource Property Relationship References are resolved, by late binding, not until Resource Properties of the referenced resource instances are needed by other resource instances during the Order Processing. These references can also be used if the referenced resource instances do not participate on the Order Processing. In contrast to Resource Property References, Resource Property Relationship References require specifying resource topology information and hence are dependent from changes in the resource topology tree. So for example, deleting a relationship in the resource tree may invalidate an already defined Resource Property Relationship Reference in the Order Document.

Extension of the Definition of Resource Property References and Resource Property Relationship References In order to allow the resolvement of Resource Property References and Resource Property Relationship References either on the Request Path or on the Response Path, the Reference definition is extended in such as way that each Reference definition additional consists of the information when the Reference is to be resolved. So each Reference definition contains additional the information 'RequestPath' or 'ResponsePath'.

| Glossary | |
|---|---|
| IT Service Environment | collection of resources and a set of behavioral conditions that altogether define a specific IT service |
| IT Service | A service in the context of information technology, e.g. providing an ERP system to an external customer |
| Systems Management Task | A logical and/or functional unit that performs some action in the context of underlying IT Service Environments. System Management Tasks may refer to one or more resource management functions. |
| Task | Short form for Systems management task |
| Systems Management Flow | A sequence of Tasks. |
| Order | The Order is a document (e.g., XML) which includes a number of tasks for each involved resource without arranging those tasks in a sequence. This differentiates Orders from workflow descriptions used by standard workflow engines. |
| OrderID | A unique ID that is assigned to an instance of an Order when being processed. |
| Order Document | A document (preferably in XML) that represents an order instance |
| Order Document Section | One section within the Order Document containing information for one specific Task. During Order Processing (see below) the respective Task reads its required input data from its section in the Order Document and writes back response data to this section. |
| Order Processing | The processing of an Order Document by the Container and Tasks. During processing the Order Document is passed from resource to resource; during transitions between two consecutive resources in the Systems Management Flow the Order Document is passed to the Container. |
| Systems Management Flow Execution Container | An environment for executing Systems Management Flows based on the resource topology, on the information in the Order Document, and on the responses of the involved resources. |
| Container | Short form for Order Processing Container |
| Resource Topology | A set of resource instances and relations between these resource instances with the primary purpose of reflecting the underlying instantiated IT Service Environment. |
| Resource Handle | A pointer to a resource—either a direct reference to a resource or an indirect reference to a resource that must be resolved into a direct reference (the notion of direct and indirect references is, for example, mentioned in the Global Grid Forum Open Grid Service Infrastructure (OGSI)—direct references are called Grid Service References (GSR), and indirect references are named Grid Service Handles (GSH)). Another example for direct references are End Point References as defined in the WS-Addressing standard. |
| Resource Property | Information about the persistence state of a resource instance. Resource Properties can be queried by calling the operations getResourceProperty and getMultipleResourceProperties. Resource Properties and the operations getResourceProperty and |

| Glossary | |
|---|---|
| | getMultipleResourceProperties are already defined in the WS-ResourceProperties standard. |
| Resource Type | Type of a resource instance. Each resource instance exposes its Resource Type as Resource Property. It is used as (indirect) reference to the correct factory when creating a resource instance of this type. |
| Resource Instance Name | Name of a resource instance. Each resource instance exposes its Resource Instance Name as Resource Property. It is used as additional information when delegating the Order Document to next resource in the resource topology tree and as optional information for specifying Resource Property References and Resource Property Relationship References. The pair (Resource Type, Resource Instance Name) must be unique for all resource instances that are involved in processing of one Order. |
| Resource Property Reference | Indirect reference to a Resource Property of a resource instance. It consists of the Resource Type, the optional Resource Instance Name and the resource property name. |
| Resource Property Relationship Reference | Indirect reference to a Resource Property of a resource instance. It consists of the Resource Type, the optional Resource Instance Name, one or multiple names of relations and the resource property name. |
| Reference | Short form for Resource Property Reference or Resource Property Relationship Reference. |

The invention claimed is:

1. A computer-implemented method for executing system management flows in system management systems for IT Service Environments, wherein said system management system is an Order Processing Environment, wherein said Order Processing Environment includes at least an Order Processing Container, Relationship Registry, and an Order which is being processed by said Order Processing Container, wherein said Order includes a number of resource specific Tasks without arranging those in a sequence, wherein said Tasks provide actions for creating and/or modifying resource topologies, wherein each Task includes Resource Property References specified by Resource Type and Resource Property Name and Resource Property Relationship References specified by Resource Type and at least one Relation name and Resource Property Name, wherein said method is part of the normal Order Processing and is being executed if said Order is returned from a resource (sending resource) to said Container, the method comprising the steps of:
 a) querying said Order for all Resource Property References which specify properties of said sending resource,
 b) determining said values of said specified properties of sending resource,
 c) replacing said references by said values in said Order,
 d) querying said Relationship Registry for a resource which has a relationship to said sending resource by said Order Processing Container,
 e) querying said Order for said resource of step d) for resource property relationship references which specify properties of said identified resource as a starting point,
 f) querying said Relationship Registry for a resource which has a relationship to said resource of step d) and which is named by a relation name specified in the resource property relationship reference,
 g) determining said values of said specified properties of said resource according to step f),
 h) replacing said resource property relationship reference by said values in said Order, and
 j) repeating said steps a)-h) for all sending resources.

2. The method according to claim 1, wherein said method further comprises the step of: each resource providing an interface for querying its resource properties.

3. The method according to claim 2, wherein said method further comprises the step of: said interface providing an additional query functionality for querying all or parts of the resource property names provided by said resource.

4. The method according to claim 1, wherein said method further comprises the step of: including an additional Resource Instance Name in said Resource Property References or Resource Property Relationship Reference if more than one Resource Instances of the same Resource Type are referenced by said References.

5. The method according claim 1, wherein said step f)comprises the steps of:
 i) querying said Relationship Registry for resources which have relationship to said identified resource according to step d) and which is named by the first relation name specified in the resource property relationship reference; and
 ii) storing said identified resource, and repeating said step i) for all subsequent relation names in said Resource Property Relationship Reference.

6. The method according claim 1, wherein said method further comprises the step of: each resource providing an interface for processing said Order.

7. System for executing system management flows in system management systems for IT Service Environments, wherein said system management system is an Order Processing Environment, wherein said Order Processing Environment includes a computer having at least an Order Processing Container, Relationship Registry, and an Order which is being processed by said Order Processing Container, wherein said Order includes a number of resource specific Tasks without being arranged in a sequence, wherein said Tasks provide actions for creating and/or modifying resource topologies, wherein each Task includes Resource Property References specified by Resource Type and Resource Property Name and Resource Property Relationship References specified by Resource Type and at least one Relation name and Resource Property Name, wherein said system includes a Reference Resolvement Function Component which extends the Order Processing Environment and becomes involved if said Order is returned from a resource (sending resource) to said Container, wherein said system is configured to perform a method comprising:
 a) querying said Order for all Resource Property References which specify properties of said sending resource,
 b) determining said values of said specified properties of said sending resource,
 c) replacing said references by said values in said Order,
 d) querying said Relationship Registry for resources which have a relationship to said first resource by said Order Processing Container,
 e) querying said Order for said first resource for resource property relationship references which specify properties of said identified resource as a starting point, f) querying said Relationship Registry for a resource which has a relationship to said identified resource and which is named by a relation name specified in the resource property relationship reference, g) determining said values of said specified properties of said resource, h) replacing said resource property relationship reference by said values in said Order, and i) activating a)-h) for each sending resource.

8. The system according to claim 7, wherein each resource provides an interface for querying its resource properties by said Reference Resolvement Function Component.

9. The system according to claim 8, wherein said interface provides an additional query functionality for querying all or parts of the resource property names provided by said resource.

10. The system according to claim 7, wherein said Resource Property References or Resource Property Relationship Reference includes an additional Resource Instance Name if more than one Resource Instances of the same Resource Type are referenced by said References.

11. The system according claim 7, wherein each resource provides an interface for processing said Order.

12. A computer program product stored on non-transitory computer usable medium comprising computer readable program instructions for causing a computer to perform the following method steps when said computer program is executed on a computer, said computer comprising a system management system, wherein said system management system is an Order Processing Environment, wherein said Order Processing Environment includes at least an Order Processing Container, Relationship Registry, and an Order which is being processed by said Order Processing Container, wherein said Order includes a number of resource specific Tasks without arranging those in a sequence, wherein said Tasks provide actions for creating and/or modifying resource topologies, wherein each Task includes Resource Property References specified by Resource Type and Resource Property Name and Resource Property Relationship References specified by Resource Type and at least one Relation name and Resource Property Name, wherein said method is part of the normal Order Processing and is being executed if said Order is returned from a resource (sending resource) to said Container, the method steps comprising:

a) querying said Order for all Resource Property References which specify properties of said sending resource, b) determining said values of said specified properties of sending resource, c) replacing said references by said values in said Order, d) querying said Relationship Registry for a resource which has a relationship to said sending resource by said Order Processing Container, e) querying said Order for said resource of step d) for resource property relationship references which specify properties of said identified resource as a starting point, f) querying said Relationship Registry for a resource which has a relationship to said resource of step d) and which is named by a relation name specified in the resource property relationship reference, g) determining said values of said specified properties of said resource according to step f), h) replacing said resource property relationship reference by said values in said Order, and j) repeating said steps a)-h) for all sending resources.

13. The computer program product of claim 12 further comprising additional computer readable program instructions for causing said computer to perform the step of: each resource providing an interface for querying its resource properties.

14. The computer program product of claim 13 further comprising additional computer readable program instructions for causing said computer to perform the step of: said interface providing an additional query functionality for querying all or parts of the resource property names provided by said resource.

15. The computer program product of claim 12 further comprising additional computer readable program instructions for causing said computer to perform the step of: including an additional Resource Instance Name in said Resource Property References or Resource Property Relationship Reference if more than one Resource Instances of the same Resource Type are referenced by said References.

16. The computer program product of claim 12 further comprising additional computer readable program instructions wherein said step f) comprises the steps of:

i) querying said Relationship Registry for resources which have relationship to said identified resource according to step d) and which is named by the first relation name specified in the resource property relationship reference; and ii) storing said identified resource, and repeating said step i) for all subsequent relation names in said Resource Property Relationship Reference.

17. The computer program product of claim 12 further comprising additional computer readable program instructions for causing said computer to perform the step of: each resource providing an interface for processing said Order.

* * * * *